United States Patent
Hu et al.

(10) Patent No.: US 11,082,358 B2
(45) Date of Patent: Aug. 3, 2021

(54) NETWORK PATH MEASUREMENT METHOD, APPARATUS, AND SYSTEM

(71) Applicant: Huawei Technologies Co., Ltd., Shenzhen (CN)

(72) Inventors: Nongda Hu, Beijing (CN); Haizhou Xiang, Beijing (CN); Boyan Tu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 16/385,954

(22) Filed: Apr. 16, 2019

(65) Prior Publication Data

US 2019/0245803 A1 Aug. 8, 2019

Related U.S. Application Data

(63) Continuation of application No. PCT/CN2017/106557, filed on Oct. 17, 2017.

(30) Foreign Application Priority Data

Oct. 17, 2016 (CN) .......................... 201610902770.4

(51) Int. Cl.
*H04L 12/923* (2013.01)
*H04L 12/26* (2006.01)
(Continued)

(52) U.S. Cl.
CPC ........ *H04L 47/762* (2013.01); *H04L 43/0882* (2013.01); *H04L 47/11* (2013.01);
(Continued)

(58) Field of Classification Search
CPC ....... H04L 47/762; H04L 47/11; H04L 47/12; H04L 47/822; H04L 49/506; H04L 43/0882; H04L 49/1515; H04L 41/0896
See application file for complete search history.

(56) References Cited

U.S. PATENT DOCUMENTS 6,754,208 B2  6/2004 Kam et al.
7,426,185 B1  9/2008 Musacchio et al.
(Continued)

FOREIGN PATENT DOCUMENTS

CN    102835081 A    12/2012
CN    103583021 A    2/2014
(Continued)

OTHER PUBLICATIONS

Katta et al., "HULA: Scalable Load Balancing Using Programmable Data Planes," SOSR'16 Proceedings of the Symposium on SDN Research, pp. 1-12 (Mar. 14-15, 2016).

*Primary Examiner* — Ivan O Latorre
(74) *Attorney, Agent, or Firm* — Leydig, Voit & Mayer, Ltd.

(57) ABSTRACT

A network path measurement method. The method includes: obtaining a first aggregate available bandwidth of a path from the first switching node to a second switching node; obtaining a first available bandwidth of a path from a first target port of a third switching node to the first switching node, where the third switching node is a next-stage switching node connected to the first switching node; obtaining, a second available bandwidth of a path from the second switching node to a fourth switching node, where the fourth switching node is a next-stage switching node connected to the second switching node; and determining a second aggregate available bandwidth of a path from the first target port of the third switching node to the fourth switching node, the second aggregate available bandwidth is a smallest available bandwidth among the first aggregate available bandwidth, the first available bandwidth, and the second available bandwidth.

20 Claims, 13 Drawing Sheets

(51) Int. Cl.
*H04L 12/933* (2013.01)
*H04L 12/801* (2013.01)
*H04L 12/911* (2013.01)
*H04L 12/931* (2013.01)

(52) U.S. Cl.
CPC ............ *H04L 47/12* (2013.01); *H04L 47/822* (2013.01); *H04L 49/1515* (2013.01); *H04L 49/506* (2013.01)

(56) References Cited

U.S. PATENT DOCUMENTS

| | | | |
|---|---|---|---|
| 9,166,886 B1 | 10/2015 | Kabbani et al. | |
| 9,813,356 B1* | 11/2017 | Kim | H04L 49/1515 |
| 2002/0146003 A1* | 10/2002 | Kam | H04Q 3/68 |
| | | | 370/388 |
| 2004/0151134 A1* | 8/2004 | Bohm | H04Q 3/68 |
| | | | 370/321 |
| 2007/0121499 A1* | 5/2007 | Pal | H04L 49/1515 |
| | | | 370/230 |
| 2007/0253334 A1 | 11/2007 | Mehta et al. | |
| 2008/0212472 A1* | 9/2008 | Musacchio | H04Q 3/68 |
| | | | 370/232 |
| 2012/0250574 A1 | 10/2012 | Marr | |
| 2014/0029627 A1* | 1/2014 | Kumar | H04L 47/25 |
| | | | 370/419 |
| 2015/0110488 A1 | 4/2015 | Schlansker et al. | |
| 2016/0044392 A1* | 2/2016 | Surek | H04J 3/1652 |
| | | | 398/45 |
| 2016/0164804 A1* | 6/2016 | Mekad | H04L 49/101 |
| | | | 370/401 |
| 2017/0026263 A1* | 1/2017 | Gell | G06F 16/1844 |
| 2018/0139132 A1 | 5/2018 | Edsall et al. | |

FOREIGN PATENT DOCUMENTS

| | | |
|---|---|---|
| CN | 104380679 A | 2/2015 |
| CN | 105706400 A | 6/2016 |
| CN | 105763469 A | 7/2016 |

* cited by examiner

600

S601: A first switching node in a Clos switching network obtains a first aggregate available bandwidth of a path from the first switching node to a second switching node, where the first switching node and the second switching node are same-stage switching nodes in the Clos switching network S602: The first switching node obtains a first available bandwidth of a path from a first target port of a third switching node to the first switching node, where the third switching node is a next-stage switching node connected to the first switching node S603: The first switching node obtains a second available bandwidth of a path from the second switching node to a fourth switching node, where the fourth switching node is a next-stage switching node connected to the second switching node S604: The first switching node determines a second aggregate available bandwidth of a path from the first target port of the third switching node to the fourth switching node, where the second aggregate available bandwidth is a smallest available bandwidth among the first aggregate available bandwidth, the first available bandwidth, and the second available bandwidth

FIG. 6

700 | A third switching node in a Clos switching network obtains a first available bandwidth of a path from a first target port of the third switching node to a first switching node, where the third switching node is a next-stage switching node connected to the first switching node ~ S701

The third switching node obtains a third aggregate available bandwidth of a path from the first switching node to a fourth switching node, where the fourth switching node and the third switching node are same-stage switching nodes ~ S702

The third switching node determines a second aggregate available bandwidth of a path from the first target port of the third switching node to the fourth switching node, where the second aggregate available bandwidth is a smaller available bandwidth between the first available bandwidth and the third aggregate available bandwidth ~ S703

FIG. 7

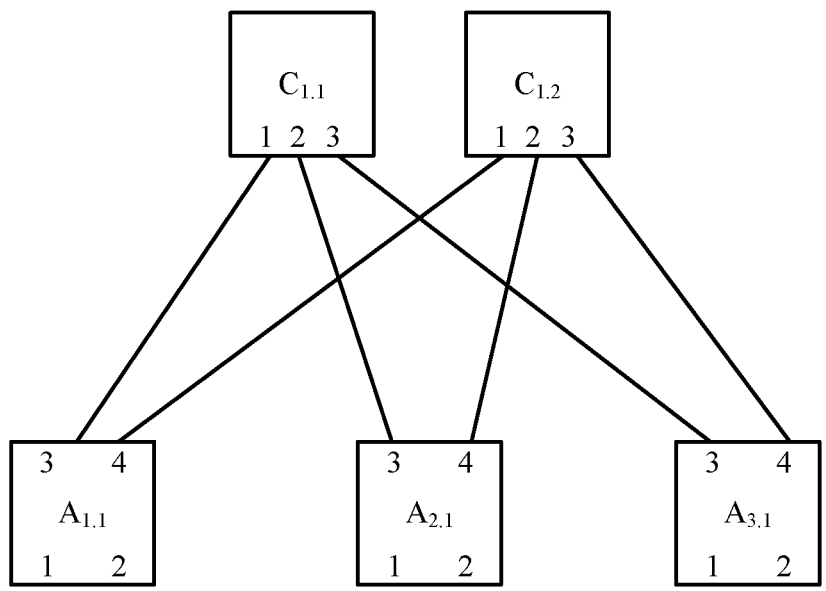

FIG. 8

NETWORK PATH MEASUREMENT METHOD, APPARATUS, AND SYSTEM

CROSS-REFERENCE TO RELATED APPLICATIONS

This application is a continuation of International Application No. PCT/CN2017/106557, filed on Oct. 17, 2017, which claims priority to Chinese Patent Application No. 201610902770.4, filed on Oct. 17, 2016. The disclosures of the aforementioned applications are hereby incorporated by reference in their entireties.

TECHNICAL FIELD

The present disclosure relates to the field of network technologies, and in particular, to a network path measurement method, apparatus, and system.

BACKGROUND

With the development of cloud computing, data centers are deployed on a large scale. A Clos switching network is a special multistage interconnection network. With high performance and high scalability, a multistage Clos switching network is gradually becoming a mainstream architecture of a data center network. For example, FIG. 1 and FIG. 2 are schematic diagrams of two Clos switching networks of different stages: a spine-and-leaf (Spine-Leaf) switching network and a fat-tree (Fat-Tree) switching network, respectively. In FIG. 1 and FIG. 2, a circle represents a computing node, a rectangle represents a switching node, and a straight line represents a link between nodes.

As shown in FIG. 1 or FIG. 2, in the multistage Clos switching network, a plurality of paths exist between a pair of edge switching nodes. To implement high performance of the network, efficient load balancing needs to be performed among different paths. That is, traffic is dynamically scheduled based on a path congestion status, so that network load is evenly distributed, and local network congestion is reduced, thereby implementing high performance of the network. However, it is relatively difficult to obtain the path congestion status fast and accurately with low overheads. A stage-by-stage backpressure method is an existing common congestion measurement method. In the stage-by-stage backpressure method, switching nodes send congestion information backwards stage by stage along each path, so as to determine a congestion status of each path between a pair of edge switching nodes based on the congestion information. The congestion information may be represented in a plurality of manners, such as an available bandwidth of a path. However, a network path measurement method based on the stage-by-stage backpressure method is not accurate enough.

SUMMARY

The present disclosure provides a network path measurement method, apparatus, and system, so as to improve efficiency of network path measurement.

According to a first aspect, a network path measurement method is provided, including: obtaining, by a first switching node in a Clos switching network, a first aggregate available bandwidth of a path from the first switching node to a second switching node, where the first switching node and the second switching node are same-stage switching nodes in the Clos switching network; obtaining, by the first switching node, a first available bandwidth of a path from a first target port of a third switching node to the first switching node, where the third switching node is a next-stage switching node connected to the first switching node; obtaining, by the first switching node, a second available bandwidth of a path from the second switching node to a fourth switching node, where the fourth switching node is a next-stage switching node connected to the second switching node; and determining, by the first switching node, a second aggregate available bandwidth of a path from the first target port of the third switching node to the fourth switching node, where the second aggregate available bandwidth is a smallest available bandwidth among the first aggregate available bandwidth, the first available bandwidth, and the second available bandwidth.

The first switching node in the Clos switching network can calculate, in the foregoing manner, an aggregate available bandwidth of a path from a first target port of at least one next-stage switching node connected to the first switching node to another next-stage switching node, so that the next-stage switching node dynamically schedules traffic between ports based on an aggregate available bandwidth corresponding to each port, to implement load balancing. The method simplifies network path measurement and improves efficiency of the network path measurement.

In a possible implementation, the obtaining, by a first switching node in a Clos switching network, a first aggregate available bandwidth of a path from the first switching node to a second switching node includes: receiving, by the first switching node, first information from each of a plurality of fifth switching nodes, where the first information indicates an aggregate available bandwidth of a first path corresponding to each of the plurality of fifth switching nodes, the plurality of fifth switching nodes are previous-stage switching nodes connected to the first switching node, and the first path is a path from the first switching node to the second switching node through each fifth switching node; and determining, by the first switching node based on the first information, a sum of aggregate available bandwidths of first paths corresponding to the plurality of fifth switching nodes as the first aggregate available bandwidth.

In a possible implementation, the first switching node and the second switching node are next-stage switching nodes connected to a plurality of sixth switching nodes in the Clos switching network; and the obtaining, by a first switching node in a Clos switching network, a first aggregate available bandwidth of a path from the first switching node to a second switching node includes: obtaining, by the first switching node, an uplink available bandwidth of a path from the first switching node to each of the plurality of sixth switching nodes; receiving, by the first switching node, second information from each of the sixth switching nodes, where the second information is used to indicate a downlink available bandwidth from each of the sixth switching nodes to the second switching node; determining, by the first switching node, a smaller available bandwidth between the uplink available bandwidth and the downlink available bandwidth as an available bandwidth corresponding to each of the sixth switching nodes; and determining a sum of available bandwidths corresponding to the plurality of sixth switching nodes as the first aggregate available bandwidth.

In a possible implementation, the obtaining, by the first switching node, a second available bandwidth of a path from the second switching node to a fourth switching node includes: receiving, by the first switching node, third information sent by the second switching node, where the third information is used to indicate that an available bandwidth of the path from the second switching node to the fourth switching node is the second available bandwidth.

In a possible implementation, the method further includes: sending, by the first switching node, fourth information to the third switching node, where the fourth information is used to indicate that an available bandwidth from the first target port of the third switching node to the fourth switching node is the second aggregate available bandwidth.

According to a second aspect, a network path measurement method is provided, including: obtaining, by a third switching node in a Clos switching network, a first available bandwidth of a path from a first target port of the third switching node to a first switching node, where the third switching node is a next-stage switching node connected to the first switching node; obtaining, by the third switching node, a third aggregate available bandwidth of a path from the first switching node to a fourth switching node, where the fourth switching node and the third switching node are same-stage switching nodes; and determining, by the third switching node, a second aggregate available bandwidth of a path from the first target port of the third switching node to the fourth switching node, where the second aggregate available bandwidth is a smaller available bandwidth between the first available bandwidth and the third aggregate available bandwidth.

The third switching node in the Clos switching network can calculate an aggregate available bandwidth from the first target port of the third switching node to the fourth switching node in the foregoing manner, so that the third switching node dynamically schedules traffic between ports based on an aggregate available bandwidth corresponding to each port, to implement load balancing. This improves efficiency of network path measurement.

In a possible implementation, the third aggregate available bandwidth is a smaller available bandwidth between a first aggregate available bandwidth and a second available bandwidth, the first aggregate available bandwidth is an aggregate available bandwidth of a path from the first switching node to a second switching node, the second available bandwidth is a second available bandwidth of a path from the second switching node to the fourth switching node, and the second switching node is a previous-stage switching node connected to the fourth switching node.

In a possible implementation, the obtaining, by the third switching node, a third aggregate available bandwidth of a path from the first switching node to a fourth switching node includes: receiving, by the third switching node, first indication information from the first switching node, where the first indication information is used to indicate that an aggregate available bandwidth of the path from the first switching node to the fourth switching node is the third aggregate available bandwidth.

In a possible implementation, the obtaining, by the third switching node, a third aggregate available bandwidth of a path from the first switching node to a fourth switching node includes: receiving, by the third switching node, second indication information sent by the first switching node, where the second indication information is used to indicate the first aggregate available bandwidth of the path from the first switching node to the second switching node; receiving, by the third switching node, third indication information sent by the second switching node, where the third indication information is used to indicate the second available bandwidth of the path from the second switching node to the fourth switching node; and determining, by the third switching node, the third aggregate available bandwidth, where the third aggregate available bandwidth is the smaller available bandwidth between the first aggregate available bandwidth and the second available bandwidth.

In a possible implementation, the method further includes: determining, by the third switching node, a fourth aggregate available bandwidth from the third switching node to the fourth switching node, where the fourth aggregate available bandwidth is a sum of aggregate available bandwidths of paths from all ports of the third switching node to the fourth switching node.

According to a third aspect, an apparatus is provided. The apparatus includes modules configured to perform the method in the first aspect. The method in the first aspect and the apparatus are based on a same inventive concept, and a problem resolving principle of the apparatus is corresponding to the solution of the method design in the first aspect. Therefore, for implementation of the apparatus, refer to implementation of the method. Same parts are not described again.

According to a fourth aspect, an apparatus is provided. The apparatus includes modules configured to perform the method in the second aspect. The method in the second aspect and the apparatus are based on a same inventive concept, and a problem resolving principle of the apparatus is corresponding to the solution of the method design in the second aspect. Therefore, for implementation of the apparatus, refer to implementation of the method. Same parts are not described again.

According to a fifth aspect, a switching network system is provided. The switching network system includes the apparatus in the third aspect and the apparatus in the fourth aspect.

According to a sixth aspect, an apparatus is provided, including: a memory, configured to store a program; a transceiver, configured to communicate with another device; and a processor, configured to execute the program in the memory. When the program is executed, the processor is configured to perform the method in the first aspect.

According to a seventh aspect, an apparatus is provided, including: a memory, configured to store a program; a transceiver, configured to communicate with another device; and a processor, configured to execute the program in the memory. When the program is executed, the processor is configured to perform the method in the second aspect.

According to an eighth aspect, a switching network system is provided. The switching network system includes the apparatus in the sixth aspect and the apparatus in the seventh aspect.

According to a ninth aspect, a system chip is provided. The system chip includes modules configured to perform the method in the first aspect.

According to a tenth aspect, a system chip is provided. The system chip includes modules configured to perform the method in the second aspect.

According to an eleventh aspect, a switching network system is provided. The switching network system includes the system chip in the ninth aspect and the system chip in the tenth aspect.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

FIG. 6 is a schematic block diagram of a network path measurement method according to another embodiment of the present disclosure;

FIG. 7 is a schematic block diagram of a network path measurement method according to still another embodiment of the present disclosure;

FIG. 8 is a schematic topology diagram of a Clos switching subnetwork according to still another embodiment of the present disclosure;

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some rather than all of the embodiments of the present disclosure. All other embodiments obtained by a person of ordinary skill in the art based on the embodiments of the present disclosure without creative efforts shall fall within the protection scope of the present disclosure.

It should be noted that, a bandwidth in the embodiments of the present disclosure may be represented by an absolute bandwidth value, or may be represented by a quantized value. For example, the bandwidth may be represented by bit/s (bit/s, that is, bps), or may be represented by a quantized bandwidth value. A representation manner of the bandwidth is not limited in the embodiments of the present disclosure.

In addition, in the embodiments of the present disclosure, network path measurement may generally be measurement of a shortest network path between switching nodes.

For ease of understanding the embodiments of the present disclosure, a concept and an architecture of a Clos switching network are described first.

Figure 1:
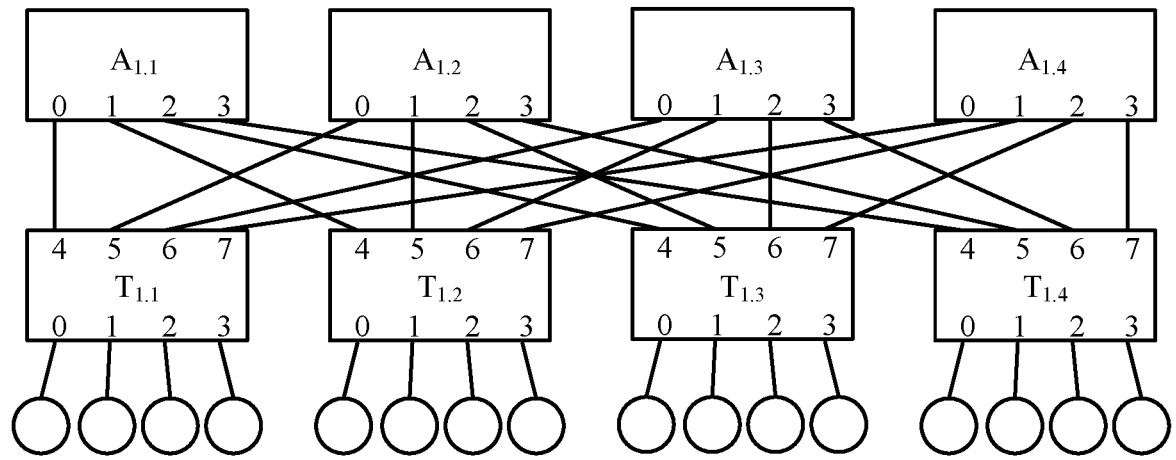
FIG. 1 is a schematic structural diagram of a spine-and-leaf switching network according to an embodiment of the present disclosure.
Figure 2:
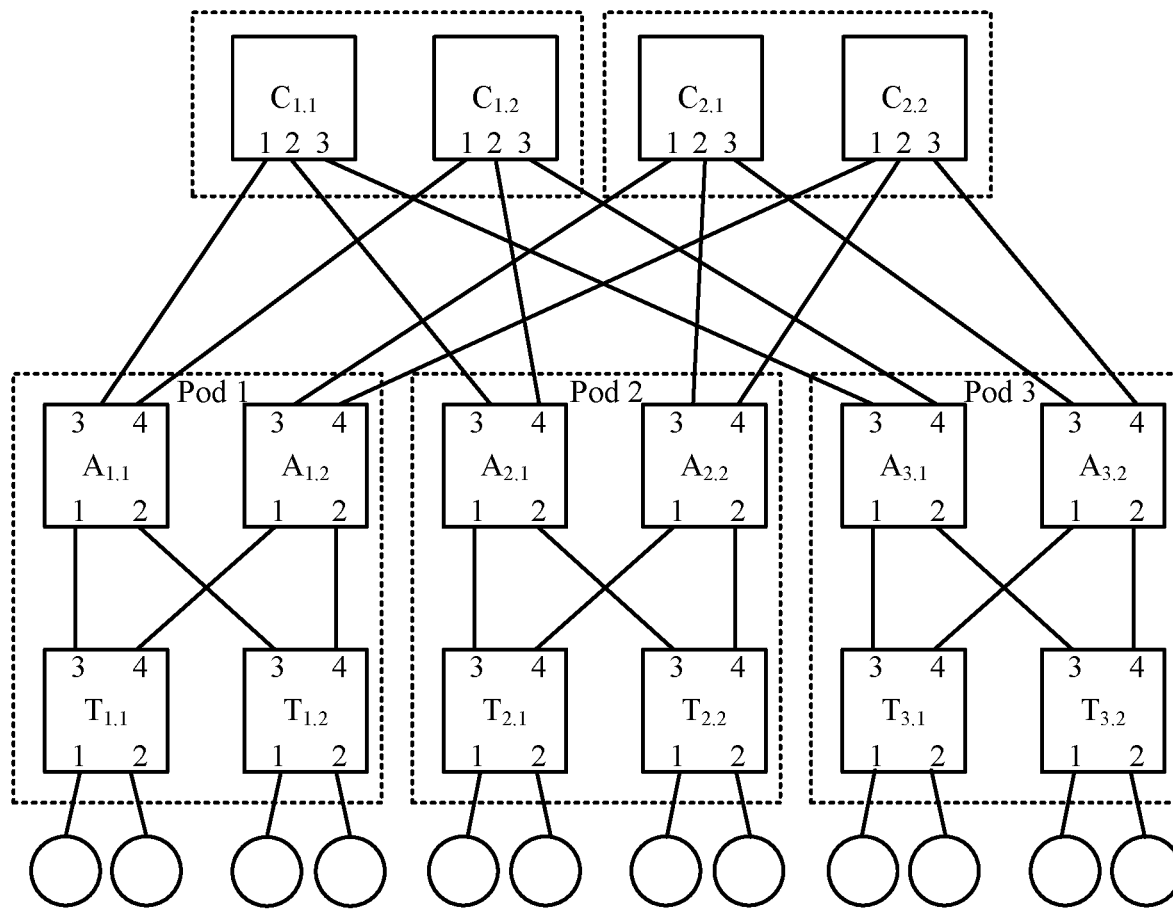
FIG. 2 is a schematic structural diagram of a fat-tree switching network according to an embodiment of the present disclosure.

The Clos switching network is a special multistage interconnection network (Multistage Interconnection Networks). For example, the Clos switching network may include a spine-and-leaf switching network shown in FIG. 1 and/or a fat-tree switching network shown in FIG. 2. In an example, a multistage Clos switching network described in the present disclosure may be constructed by using the following method: Given two groups of switching nodes, a two-stage Clos switching network can be constructed by connecting each switching node in a first group to each switching node in a second group. The two-stage Clos switching network is considered as a virtual switching node, a plurality of virtual switching nodes constitute a group, and a three-stage Clos switching network can be constructed by connecting each virtual switching node to each switching node in a third group of switching nodes. For example, as shown in FIG. 2, each virtual switching node may be referred to as a pod. Recursively, an i-stage Clos switching network is considered as a virtual switching node, a plurality of virtual switching nodes constitute a group, and an (i+1)-stage Clos switching network can be constructed by connecting each virtual switching node to each switching node in an $(i+1)^{th}$ group of switching nodes.

In an (i+1)-stage Clos switching network, a switching node in a first group of switching nodes is referred to as an edge switching node, a switching node in an $(i+1)^{th}$ group of switching nodes is referred to as a core switching node or a root switching node, and a switching node in a second group to an $i^{th}$ group of switching nodes is referred to as an intermediate switching node. Particularly, for a three-stage Clos switching network, in the embodiments of the present disclosure, the edge switching node may be referred to as a TOR switching node (denoted by $T_{i,j}$), the core switching node is referred to as a Core switching node (denoted by $C_{i,j}$), and the intermediate switching node is referred to as an Agg switching node (denoted by $A_{i,j}$).

In an (i+1)-stage Clos switching network, only an edge switching node is connected to a computing node (for example, a server).

Figure 3:
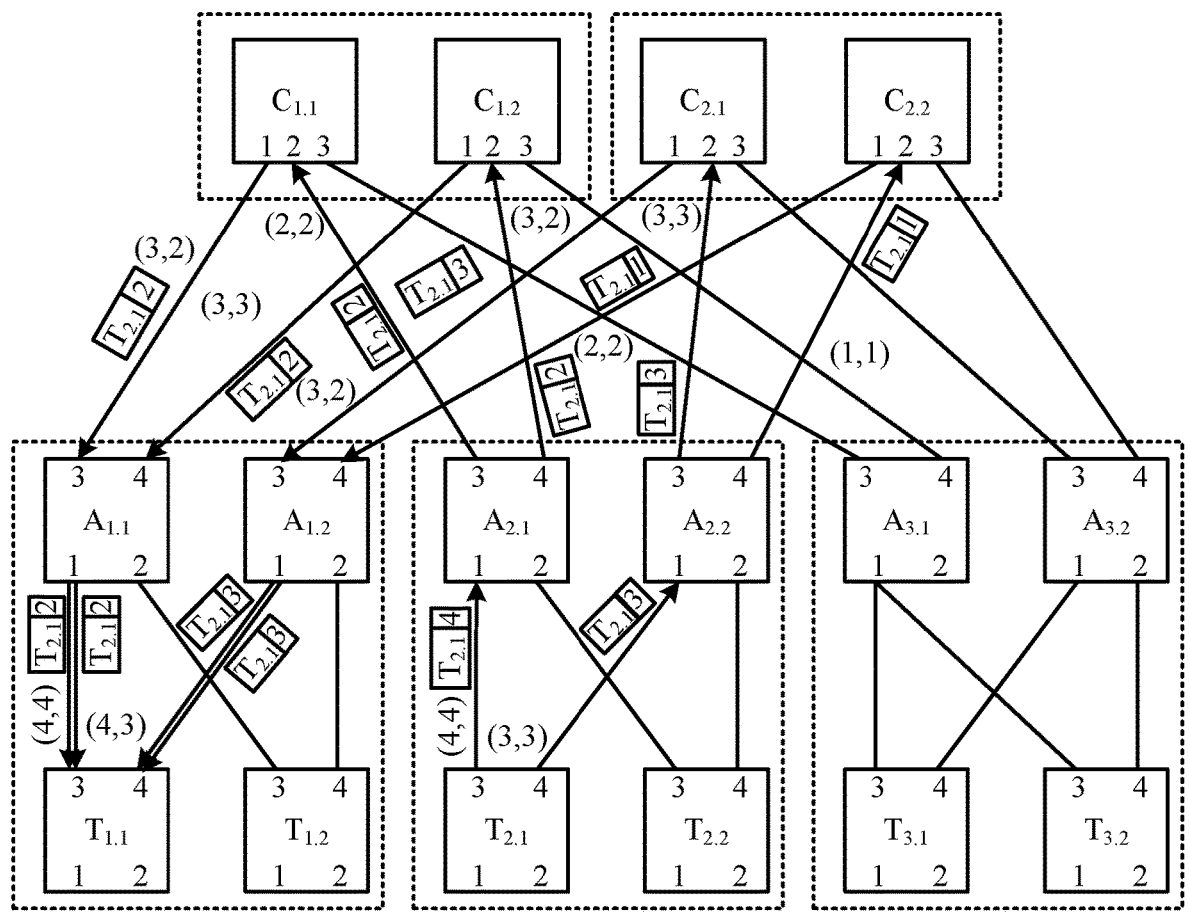
FIG. 3 is a schematic diagram of a backpressure-based network path measurement method according to an embodiment of the present disclosure.
Figure 4:
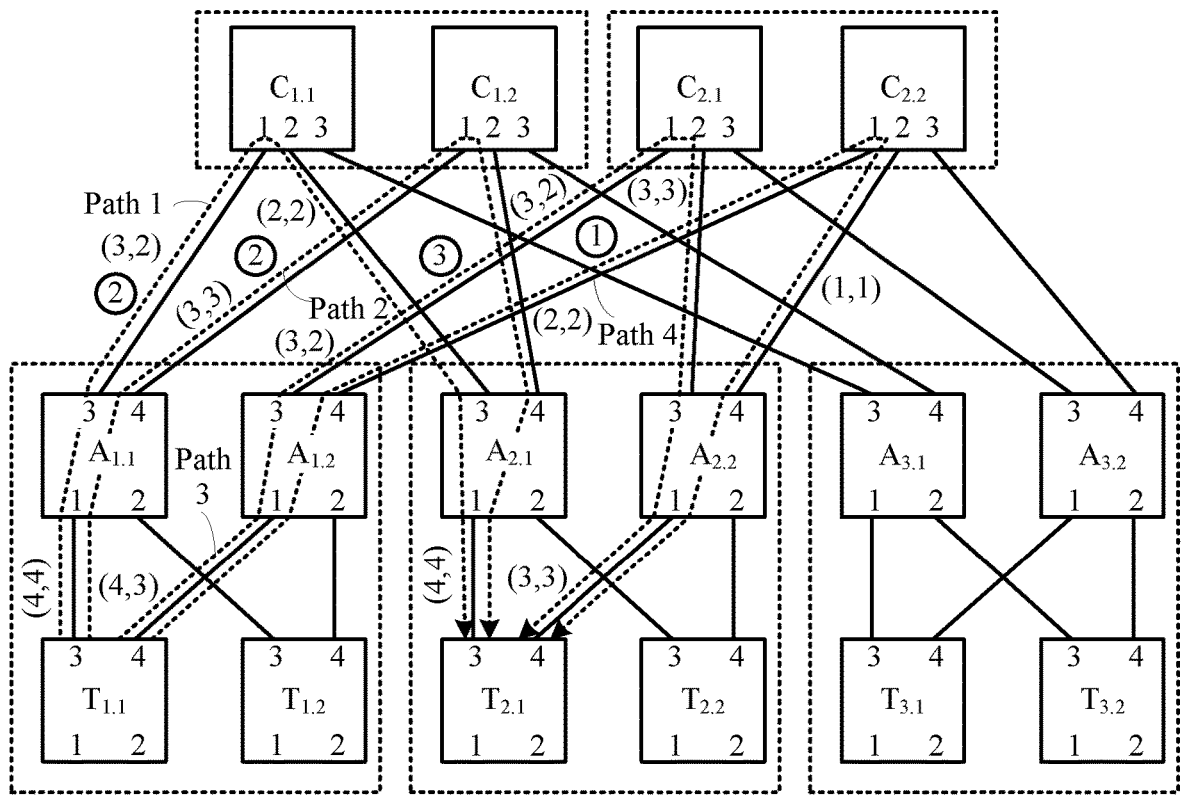
FIG. 4 is a schematic diagram of a backpressure-based network path measurement method according to another embodiment of the present disclosure.

For ease of understanding the embodiments of the present disclosure, the following describes a network path measurement method that is based on a stage-by-stage backpressure method in the prior art. For example, FIG. 3 shows how to implement measurement of congestion of a plurality of paths from an edge switching node $T_{1,1}$ to an edge switching node $T_{2,1}$ based on stage-by-stage backpressure. In FIG. 3, a quantized value of an available bandwidth is used to measure a congestion status, and a larger value indicates a larger available bandwidth and a lower congestion level. For each link, "(an uplink available bandwidth of the link and a downlink available bandwidth of the link)" are used to represent available bandwidths of the link in two directions. With reference to the example shown in FIG. 3, the measurement process is described as follows: First, a switching node $T_{2.1}$ sends indication information to both previous-hop switching nodes $A_{2.1}$ and $A_{2.2}$ by using an upper port P3 (it should be noted that, P* in the embodiments of the present disclosure is used to indicate a port * of a corresponding switching node; for example, P3 represents a port 3 of $T_{2.1}$) and an upper port P4 of the switching node $T_{2.1}$, to indicate available bandwidths of paths from the previous-hop switching nodes to $T_{2.1}$. Second, after receiving the indication information, a switching node, for example, $A_{2.1}$, stores the indication information, and further feeds back available bandwidth information to previous-hop switching nodes $C_{1.1}$ and $C_{1.2}$. The available bandwidth information that is fed back in this case needs to be updated based on available bandwidth information of links between $A_{2.1}$ and the previous-hop switching nodes. An updating method is taking a smallest value among a received available bandwidth value and available bandwidths of the link, that is, using an available bandwidth of a bottleneck link on a path as the available bandwidth of the path. The process may be continued until available bandwidth information is fed back to the edge switching node $T_{1.1}$. In a backpressure process, path information may be recorded in the indication information, and when the indication information is finally fed back to an edge node, the edge node can distinguish between different paths. As shown in FIG. 3, the switching node $T_{1.1}$ receives available bandwidth information of four different paths that is sent from the switching node $T_{2.1}$ in a stage-by-stage backpressure manner. FIG. 4 shows the four different paths and available bandwidths of the four different paths, where the available bandwidths are represented by figures in circles. Based on the method, available bandwidths of all shortest paths between any two switching nodes are measurable.

The foregoing network path measurement method based on stage-by-stage backpressure has the following disadvantages: First, because a large quantity of paths may exist between two edge switching nodes, transmission of congestion information occupies a large quantity of link bandwidths. For example, in a fat-tree network constructed by using homogeneous switching nodes having m ports, a quantity of different paths between a pair of edge switching nodes may be up to $m^2/4$. Second, whether a plurality of paths between a pair of edge switching nodes share an available bandwidth cannot be determined. For example, as shown in FIG. 4, available bandwidths of a path 3 and a path 4 starting from an upper port P4 of a switching node $T_{1.1}$ are 3 and 1, respectively, and a sum of the available bandwidths is 4. However, because an uplink available bandwidth of a shared link $<T_{2.1}, A_{2.2}>$ of the path 3 and the path 4 is 3, the path 3 and the path 4 share an available bandwidth. In other words, an aggregate available bandwidth of the two paths is less than the sum of the available bandwidths of the two paths. Available bandwidths of a path 1 and a path 2 starting from an upper port P3 of the switching node $T_{1.1}$ are 2 and 2, respectively, and a sum of the available bandwidths is 4. Because an available bandwidth of a shared physical link $<T_{1.1}, A_{1.1}>$ of the path 1 and the path 2 is 4, the path 1 and the path 2 do not share an available bandwidth. In other words, an aggregate available bandwidth of the two paths is equal to the sum of the available bandwidths of the two paths.

To decrease a link bandwidth occupied by network path measurement and improve efficiency of the network path measurement, the embodiments of the present disclosure provide a network path measurement method, apparatus, and system. The solutions are obtained based on the following core idea:

First, for path measurement of the Clos switching network, although a plurality of paths exist between a pair of edge nodes (for example, four paths exist between $T_{1.1}$ and $T_{2.1}$ in FIG. 4), an edge switching node does not need to learn how traffic is allocated among the plurality of paths, but only needs to learn how much traffic should be allocated among egress ports (for example, the port P3 and the port P4 of $T_{1.1}$ in FIG. 4) of the edge switching node. By analogy, each switching node only needs to learn how traffic is allocated on egress ports of the switching node, and does not need to learn how much traffic needs to be allocated to each path from the switching node to a destination switching node. This decreases an amount of information that needs to be maintained by a single switching node from "a quantity of paths from the switching node to a destination switching node" to "a quantity of egress ports of the switching node".

Second, although the switching node (for example, $T_{1.1}$ in FIG. 4) only needs to learn how traffic is allocated on the egress ports of the switching node, an amount of traffic that should be allocated should depend on available bandwidths of links connected to the egress ports of the switching node, but should depend on an aggregate available bandwidth from each egress port of the switching node to a destination switching node (for example, $T_{1.1}$ to $T_{2.1}$ in FIG. 4). Herein, a group of paths from an egress port of a source switching node to a destination switching node is considered as an aggregate path, and an available bandwidth of the aggregate path may be referred to as an aggregate available bandwidth. In addition, an aggregate available bandwidth from an egress port of a switching node to another switching node is usually not equal to a sum of available bandwidths of paths from the egress port to the another switching node, because the plurality of paths may share an available bandwidth. For example, in FIG. 4, an available bandwidth from the port P3 of $T_{1.1}$ to $T_{2.1}$ is not necessarily equal to a sum of available bandwidths of a path "$T_{1.1} \rightarrow A_{1.1} \rightarrow C_{1.1} \rightarrow A_{2.1} \rightarrow T_{2.1}$" and a path "$T_{1.1} \rightarrow A_{1.1} \rightarrow C_{1.2} \rightarrow A_{2.1} \rightarrow T_{2.1}$", because the two paths may share available bandwidths of a link L $<T_{1.1}, A_{1.1}>$ and a link L $<A_{2.1}, T_{2.1}>$. A correct method for calculating an aggregate available bandwidth of an aggregate path is: segmenting the aggregate path into a combination of series-parallel path segments, calculating a sum of available bandwidths of parallel path segments, and calculating a smallest value among available bandwidths of series path segments.

Therefore, in the embodiments of the present disclosure, the aggregate path is segmented into the combination of the series-parallel path segments, and calculation of the aggregate available bandwidth of the aggregate path is converted into calculation of an aggregate available bandwidth of the parallel path segments and calculation of an aggregate available bandwidth of the series path segments. A method for calculating the aggregate available bandwidth of the parallel path segments is calculating the sum of (aggregate) available bandwidths of the path segments; and a method for calculating the aggregate available bandwidth of the series path segments is calculating a smallest value among (aggregate) available bandwidths of the path segments.

Optionally, in the embodiments of the present disclosure, there may be a plurality of definitions for calculation of the aggregate available bandwidth of the parallel path segments, including at least two definitions. A first definition may be, as described above, calculating the sum of the available bandwidths of the parallel path segments. A second definition may be averaging the available bandwidths of the parallel path segments (that is, dividing the sum of the available bandwidths of the parallel path segments by a quantity of the parallel paths). For ease of description, the first definition is used in the embodiments of the present disclosure. Apparently, in the second definition, the network path measurement method in the embodiments of the present disclosure can also be implemented. Details are not described herein. Apparently, a person skilled in the art can make equivalent modifications or variations based on the foregoing aggregate available bandwidth calculation manners, and such modifications or variations shall fall within the scope of the embodiments of the present disclosure.

Figure 5:
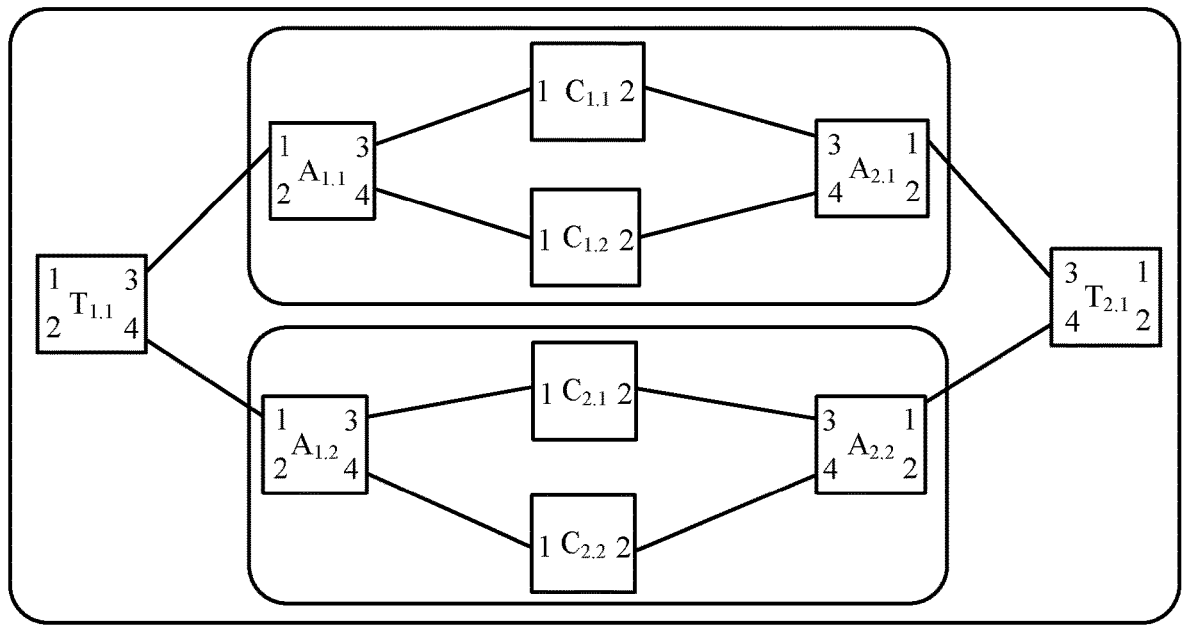
FIG. 5 is a schematic structural diagram of a multistage Clos switching network according to another embodiment of the present disclosure.

A person skilled in the art can understand that, it is not the case that an aggregate path between a source switching node and a destination switching node in all networks can be segmented into a combination of series-parallel paths, but an aggregate path between a source switching node and a destination switching node in a Clos switching network has such a characteristic. FIG. 5 is a schematic diagram of paths between a pair of edge nodes in a Clos switching network according to an embodiment of the present disclosure, and shows an inside-to-outside hierarchical aggregation characteristic of paths between switching nodes in the multistage Clos switching network. As shown in FIG. 5, because of topological regularity of the multistage Clos switching network, paths between two same-stage switching nodes in the Clos switching network have the inside-to-outside hierarchical aggregation characteristic. This can simplify measurement of an aggregate available bandwidth of the paths. Therefore, an aggregate path from a source edge switching node to a destination edge switching node in the multistage Clos switching network can be segmented into such a combination of series-parallel path segments, and the combination has a nesting characteristic. A recursive method may be used to calculate an aggregate available path bandwidth. A main idea is that congestion statuses (for example, a congestion status is represented by using an available bandwidth) of inner-layer paths may be first measured and aggregated, and then expansion and aggregation are performed outwards layer by layer, to obtain aggregate available bandwidth information of paths between same-stage switching network nodes in the Clos switching network. In the embodiments of the present disclosure, the aggregate available bandwidth of the Clos switching network can be obtained based on this recursive method.

FIG. 6 is a schematic block diagram of a network path measurement method according to an embodiment of the present disclosure. The method 600 may be performed by a switching node in a Clos switching network. As shown in FIG. 6, the method 600 includes the following steps.

S601. A first switching node in a Clos switching network obtains a first aggregate available bandwidth of a path from the first switching node to a second switching node, where the first switching node and the second switching node are same-stage switching nodes in the Clos switching network.

The first switching node may be an intermediate switching node in the Clos switching network. For example, the first switching node may be $A_{1,1}$ in FIG. 4. The first aggregate available bandwidth may be an aggregate available bandwidth of a group of paths from the first switching node to the second switching node. In other words, the first aggregate available bandwidth is an aggregate available bandwidth of all paths from the first switching node to the second switching node, or the first aggregate available bandwidth is an actual available bandwidth of an aggregate path from the first switching node to the second switching node.

S602. The first switching node obtains a first available bandwidth of a path from a first target port of a third switching node to the first switching node, where the third switching node is a next-stage switching node connected to the first switching node.

Optionally, the third switching node is a next-stage switching node connected to the first switching node. For example, the first switching node may be $A_{1,1}$ in FIG. 4, the third switching node may be $T_{1,1}$ in FIG. 4, and the first target port may be the port P3 of $T_{1,1}$ in FIG. 4. The path from the first target port of the third switching node to the first switching node may be an uplink from the third switching node to the first switching node.

S603. The first switching node obtains a second available bandwidth of a path from the second switching node to a fourth switching node, where the fourth switching node is a next-stage switching node connected to the second switching node.

Optionally, the fourth switching node is a next-stage switching node connected to the second switching node. For example, the second switching node may be $A_{2,1}$ in FIG. 4, and the fourth switching node may be $T_{2,1}$ in FIG. 4. The path from the second switching node to the fourth switching node may be a downlink from the second switching node to the fourth switching node.

S604. The first switching node determines a second aggregate available bandwidth of a path from the first target port of the third switching node to the fourth switching node, where the second aggregate available bandwidth is a smallest available bandwidth among the first aggregate available bandwidth, the first available bandwidth, and the second available bandwidth.

Optionally, the second aggregate available bandwidth may be an aggregate available bandwidth of the path from the first target port of the third switching node to the fourth switching node. According to the network path measurement method provided in this embodiment of the present disclosure, a switching node in the Clos switching network can obtain an aggregate available bandwidth from each of a plurality of egress ports of the switching node to another switching node, so that the switching node dynamically schedules traffic between the ports, to implement load balancing.

In this embodiment of the present disclosure, the first switching node in the Clos switching network can calculate, in the foregoing manner, an aggregate available bandwidth of a path from a first target port of at least one next-stage switching node connected to the first switching node to another next-stage switching node, so that the next-stage switching node dynamically schedules traffic between ports based on an aggregate available bandwidth corresponding to each port, to implement load balancing. The method simplifies network path measurement and improves efficiency of the network path measurement.

Optionally, in this embodiment of the present disclosure, the network path measurement may be performed periodically or in an event trigger manner.

Optionally, in this embodiment of the present disclosure, the first switching node may receive information sent by a previous-stage switching node of the first switching node, to indicate an aggregate available bandwidth from an egress port, connected to the previous-stage node, of the first switching node to the second switching node. The first switching node may determine the first aggregate available bandwidth of the path from the first switching node to the second switching node based on a sum of aggregate available bandwidths corresponding to a plurality of egress ports.

For example, the obtaining, by a first switching node in a Clos switching network, a first aggregate available bandwidth of a path from the first switching node to a second switching node includes: receiving, by the first switching node, first information from each of a plurality of fifth switching nodes, where the first information indicates an aggregate available bandwidth of a first path corresponding to each of the plurality of fifth switching nodes, the plurality of fifth switching nodes are previous-stage switching nodes connected to the first switching node, and the first path is a path from the first switching node to the second switching node through each fifth switching node; and determining, by the first switching node based on the first information, a sum of aggregate available bandwidths of first paths corresponding to the plurality of fifth switching nodes as the first aggregate available bandwidth.

The first path may be one path or a group of paths from the first switching node to the second switching node. A quantity of the first paths depends on a quantity of paths from the first switching node to the second switching node through each fifth switching node. In other words, the first path is a path from a first target port of the first switching node to the second switching node. The first target port of the first switching node may be an egress port through which a path from the first switching node to the fifth switching node passes. In addition, the fifth switching node may be a root switching node in the Clos switching network, or may be an intermediate switching node in the Clos switching network. When the fifth switching node is an intermediate switching node, there may be a plurality of first paths corresponding to each fifth switching node. When the fifth switching node is a root switching node, there may be one first path corresponding to each fifth switching node.

Optionally, when the first switching node and the second switching node are connected to a same previous-stage switching node, assuming that the previous-stage switching node connected to both the first switching node and the second switching node is a sixth switching node, the first aggregate bandwidth from the first switching node to the second switching node may be determined by using the following method:

The first switching node and the second switching node are next-stage switching nodes connected to a plurality of sixth switching nodes in the Clos switching network; and the obtaining, by a first switching node in a Clos switching network, a first aggregate available bandwidth of a path from the first switching node to a second switching node includes: obtaining, by the first switching node, an uplink available bandwidth of a path from the first switching node to each of the plurality of sixth switching nodes; receiving, by the first switching node, second information from each of the sixth switching nodes, where the second information is used to indicate a downlink available bandwidth from each of the sixth switching nodes to the second switching node; determining, by the first switching node, a smaller available bandwidth between the uplink available bandwidth and the downlink available bandwidth as an available bandwidth corresponding to each of the sixth switching nodes; and determining a sum of available bandwidths corresponding to the plurality of sixth switching nodes as the first aggregate available bandwidth.

Optionally, in this embodiment of the present disclosure, the obtaining, by the first switching node, a second available bandwidth of a path from the second switching node to a fourth switching node includes: receiving, by the first switching node, third information sent by the second switching node, where the third information is used to indicate that an available bandwidth of the path from the second switching node to the fourth switching node is the second available bandwidth.

Optionally, in this embodiment of the present disclosure, after determining the second aggregate available bandwidth of the third switching node connected to the first switching node, the first switching node may send a message to the third switching node, to indicate an aggregate available bandwidth from the first target port of the third switching node to another switching node, so that the third switching node stores information and implements load balancing. For example, the method 600 further includes: sending, by the first switching node, fourth information to the third switching node, where the fourth information is used to indicate that an available bandwidth from the first target port of the third switching node to the fourth switching node is the second aggregate available bandwidth.

With reference to FIG. 6, the method 600 describes a method for calculating, by a previous-stage switching node, an aggregate available bandwidth of paths between ports of next-stage switching nodes. FIG. 7 is a schematic block diagram of a network path measurement method according to another embodiment of the present disclosure. With reference to FIG. 7, the following describes the network path measurement method 700 according to the another embodiment of the present disclosure. The method 700 may be performed by a switching node in a Clos switching network. The method 700 describes a method for calculating, by a current-stage switching node, an aggregate available bandwidth of paths between ports of current-stage switching nodes. For same or similar content between the method of FIG. 7 and the method of FIG. 6, refer to a related part of FIG. 6. Details are not described herein again. The method 700 includes the following steps.

S701. A third switching node in a Clos switching network obtains a first available bandwidth of a path from a first target port of the third switching node to a first switching node, where the third switching node is a next-stage switching node connected to the first switching node.

The third switching node may be an intermediate switching node or an edge switching node in the Clos switching network. For example, the third switching node may be $T_{1.1}$ in FIG. 4, and the first switching node may be $A_{1.1}$ in FIG. 4.

S702. The third switching node obtains a third aggregate available bandwidth of a path from the first switching node to a fourth switching node, where the fourth switching node and the third switching node are same-stage switching nodes.

S703. The third switching node determines a second aggregate available bandwidth of a path from the first target port of the third switching node to the fourth switching node, where the second aggregate available bandwidth is a smaller available bandwidth between the first available bandwidth and the third aggregate available bandwidth.

In this embodiment of the present disclosure, the third switching node in the Clos switching network can calculate an aggregate available bandwidth from the first target port of the third switching node to the fourth switching node in the foregoing manner, so that the third switching node dynamically schedules traffic between ports based on an aggregate available bandwidth corresponding to each port, to implement load balancing. This improves efficiency of network path measurement.

Optionally, in the method 700, the third aggregate available bandwidth is a smaller available bandwidth between a first aggregate available bandwidth and a second available bandwidth, the first aggregate available bandwidth is an aggregate available bandwidth of a path from the first switching node to a second switching node, the second available bandwidth is a second available bandwidth of a path from the second switching node to the fourth switching node, and the second switching node is a previous-stage switching node connected to the fourth switching node.

Optionally, in the method 700, the obtaining, by the third switching node, a third aggregate available bandwidth of a path from the first switching node to a fourth switching node includes: receiving, by the third switching node, first indication information from the first switching node, where the first indication information is used to indicate that an aggregate available bandwidth of the path from the first switching node to the fourth switching node is the third aggregate available bandwidth.

Optionally, in the method 700, the obtaining, by the third switching node, a third aggregate available bandwidth of a path from the first switching node to a fourth switching node includes: receiving, by the third switching node, second indication information sent by the first switching node, where the second indication information is used to indicate the first aggregate available bandwidth of the path from the first switching node to the second switching node; receiving, by the third switching node, third indication information sent by the second switching node, where the third indication information is used to indicate the second available bandwidth of the path from the second switching node to the fourth switching node; and determining, by the third switching node, the third aggregate available bandwidth, where the third aggregate available bandwidth is the smaller available bandwidth between the first aggregate available bandwidth and the second available bandwidth.

Optionally, in this embodiment of the present disclosure, after the third switching node obtains an aggregate available bandwidth of a path from each egress port of the third switching node to the fourth switching node, the third switching node may further determine aggregate available bandwidths of all paths from the third switching node to the fourth switching node. For example, the method 700 further includes: determining, by the third switching node, a fourth aggregate available bandwidth from the third switching node to the fourth switching node, where the fourth aggregate available bandwidth is a sum of aggregate available bandwidths of paths from all ports of the third switching node to the fourth switching node.

Optionally, in the method 700, if the third switching node is not an edge switching node, there is a next-stage switching node connected to the third switching node. The third switching node may notify the next-stage switching node of the aggregate available bandwidth from the third switching node to the fourth switching node, so that the next-stage switching node continues to calculate an aggregate available bandwidth between next-stage switching nodes. For example, the method 700 may further include: sending, by the third switching node, fourth indication information to a seventh switching node, where the fourth indication information is used to indicate that an available bandwidth between the third switching node and the fourth switching node is the fourth aggregate available bandwidth, and the seventh switching node is a next-stage switching node of the third switching node.

With reference to FIG. 1 to FIG. 7, the foregoing describes the network path measurement method in the embodiments of the present disclosure. With reference to specific examples in FIG. 8 to FIG. 12, the following describes the embodiments of the present disclosure in more detail. It should be noted that the examples in FIG. 8 to FIG. 12 are merely intended to help a person skilled in the art understand the embodiments of the present disclosure, but not intended to limit the embodiments of the present disclosure to specific values or specific scenarios that are exemplified. Apparently, a person skilled in the art can make equivalent modifications or variations based on the examples in FIG. 8 to FIG. 12, and such modifications or variations shall fall within the scope of the embodiments of the present disclosure.

Based on a topological characteristic of the multistage Clos network, the network path measurement method in the embodiments of the present disclosure may be classified into two types: measurement of an aggregate available bandwidth of a path between same-stage switching nodes whose distance is 2, and measurement of an aggregate available bandwidth of a path between same-stage switching nodes whose distance is 2k (k>1). Herein, a distance between two switching nodes refers to a quantity of links from one switching node to the other switching node. In implementation, the foregoing two methods may be performed concurrently.

The following describes the technical solutions of the present disclosure in detail, sequentially describing how to measure an aggregate available bandwidth of a path between same-stage switching nodes whose distance is 2 and how to measure an aggregate available bandwidth of a path between same-stage switching nodes whose distance is 2k (k>1).

Figure 9:
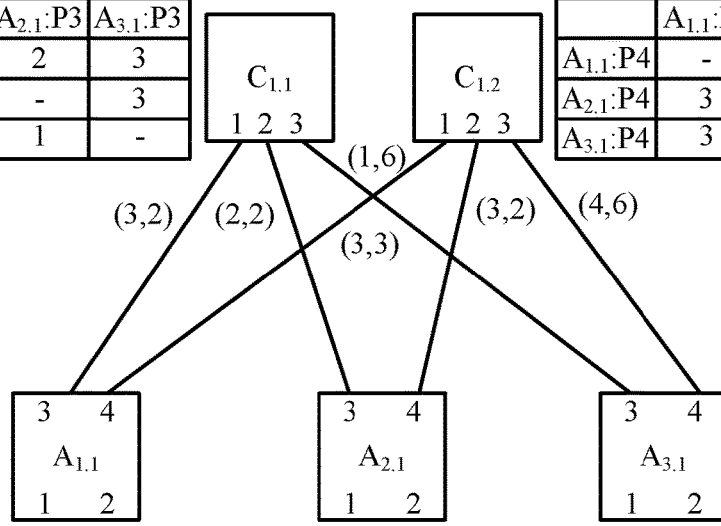
FIG. 9 is a schematic diagram of a network path measurement method according to yet another embodiment of the present disclosure.
Figure 10:
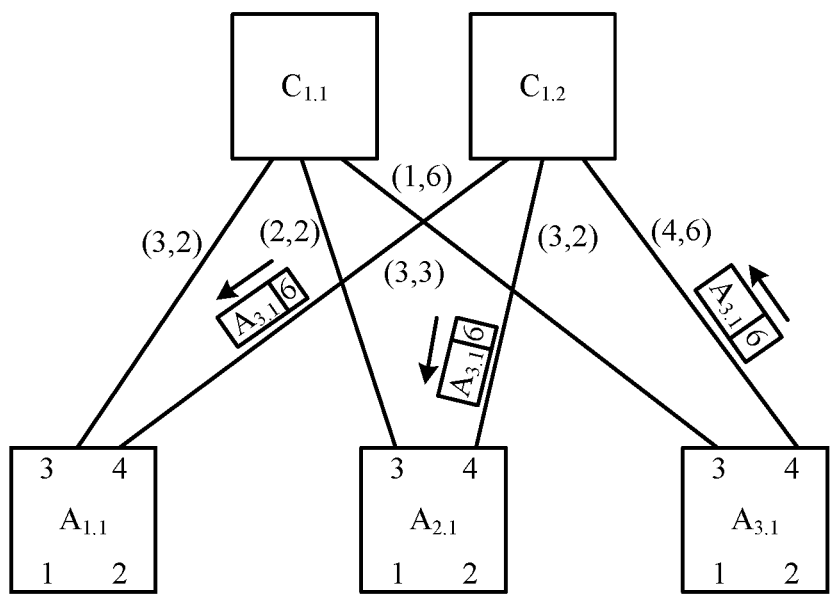
FIG. 10 is a schematic diagram of a network path measurement method according to yet another embodiment of the present disclosure.
Figure 11:
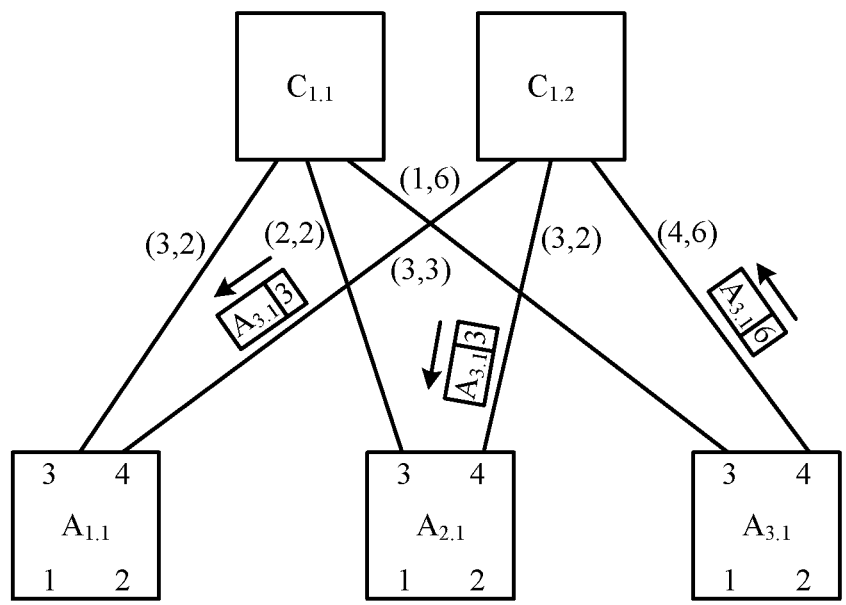
FIG. 11 is a schematic diagram of a network path measurement method according to yet another embodiment of the present disclosure.

In the multistage Clos network, a distance between a plurality of next-stage switching nodes that are interconnected by using a previous-stage switching node is 2. Herein, FIG. 8 is used as an example to describe how to measure an aggregate available bandwidth of a path between same-stage switching nodes whose distance is 2. FIG. 8 is a subdiagram of a topology of the fat-tree switching network shown in FIG. 2, where a distance between switching nodes $A_{*,1}$ in the figure is 2. FIG. 9 to FIG. 11 show methods for measuring an aggregate available bandwidth of a path between same-stage switching nodes in FIG. 8. As shown in FIG. 9 to FIG. 11, the embodiments of the present disclosure provide three methods for measuring an aggregate available bandwidth of a path between same-stage switching nodes whose distance is 2.

In a method shown in FIG. 9, a previous-stage switching node may calculate available bandwidths of paths between a plurality of downward-connected switching nodes of the previous-stage switching node in a centralized manner, and then deliver path information to corresponding downward-connected switching nodes. A specific method is shown in FIG. 9.

As shown in FIG. 9, "(an uplink available bandwidth of a link and a downlink available bandwidth of a link)" are used to represent available bandwidths of each link in an uplink direction and a downlink direction. A switching node $C_{1,*}$ may obtain available bandwidth information of each link by determining bandwidth occupancy in a sending/receiving direction of each port of the switching node $C_{1,*}$. Based on the available bandwidth information of each link, an available bandwidth of a path between two downward-connected switching nodes may be obtained through calculation of a smallest value among available bandwidths of links connecting the two downward-connected switching nodes. For example, a switching node $C_{1,1}$ is connected to a port P3 of a switching node $A_{1,1}$ by using a link L $<C_{1,1}, A_{1,1}>$, and is connected to a port P3 of a switching node $A_{2,1}$ by using a link L $<C_{1,1}, A_{2,1}>$. The switching node $C_{1,1}$ can determine, through calculation of a smallest value between an uplink available bandwidth (whose value is 3) of the link L $<C_{1.1}, A_{1.1}>$ and a downlink available bandwidth (whose value is 2) of the link L $<C_{1.1}, A_{2.1}>$, that an available bandwidth of a path from the port P3 of $A_{1.1}$ to the port P3 of $A_{2.1}$ is 2. According to the method, the switching node $C_{1.1}$ and a switching node $C_{1.2}$ can obtain path information tables, which are shown in Table 1 and Table 2 in FIG. 9, of downward-connected switching nodes $A_{1.*}$ of the switching node $C_{1.1}$ and the switching node $C_{1.2}$ through calculation.

After obtaining path information tables of downward-connected switching nodes $A_{*.1}$ of the switching node $C_{1.*}$ through calculation, the switching node $C_{1.*}$ sends corresponding path information (for example, the path information is equivalent to the first information in the method 600) to a source switching node of a path. Therefore, each switching node $A_{*.1}$ can obtain available bandwidth information of a path from $A_{*.1}$ to another same-stage switching node. In addition, because a plurality of parallel paths may exist between two switching nodes, the switching node may further obtain an available bandwidth of an aggregate path from the switching node to another switching node through calculation, where the available bandwidth of the aggregate path is equal to a sum of available bandwidths of all the parallel paths between the two switching nodes. These switching nodes may store the path information into the path information tables of these switching nodes. For example, path information tables of $A_{1.1}$, $A_{2.1}$, and $A_{3.1}$ are Table 3, Table 4, and Table 5 in FIG. 9, respectively. It may be learned from Table 4 in FIG. 9 that, there is one path from each of ports P3 and P4 of the switching node $A_{2.1}$ to the switching node $A_{3.1}$, and available bandwidths of the paths are 2 and 3, respectively. Therefore, an aggregate available bandwidth from the switching node $A_{2.1}$ to the switching node $A_{3.1}$ is 5.

In a method shown in FIG. 10, a switching node (for ease of differentiation, the switching node may be referred to as a "source switching node") may send downlink available bandwidth information of a link connected to an upper port of the switching node to another same-stage switching node that is connected to an upward-connected switching node of the switching node; and after receiving the available bandwidth information, the another same-stage switching node may calculate a path from the another same-stage switching node to the source switching node corresponding to the downlink available bandwidth information. A calculation method is taking a smallest value between an uplink available bandwidth of a link connected to a port receiving the available bandwidth information and a received available bandwidth value. For example, as shown in FIG. 10, $A_{3.1}$ sends a downlink available bandwidth (whose value is 6) of a link L $<C_{1.2}, A_{2.1}>$ to the nodes $A_{1.1}$ and $A_{2.1}$ by using an upper port P4; and after receiving information about the available bandwidth, $A_{1.1}$ compares the information with an uplink available bandwidth (whose value is 3) of a link L $<C_{1.2}, A_{1.1}>$, and takes a smallest value, to determine that an available bandwidth of a path from the port P4 of $A_{1.1}$ to $A_{2.1}$ is 3. According to the method, each switching node $A_{*.1}$ can obtain available bandwidth information of a path from $A_{*.1}$ to another same-stage switching node. In addition, because a plurality of parallel paths may exist between two switching nodes, the switching node may further obtain an aggregate available bandwidth of an aggregate path from the switching node to another switching node through calculation, where the aggregate available bandwidth of the aggregate path is equal to a sum of available bandwidths of all the parallel paths between the two switching nodes. These switching nodes store the path information into the path information tables of these switching nodes. For example, path information tables of $A_{1.1}$, $A_{2.1}$, and $A_{3.1}$ are Table 1, Table 2, and Table 3 in FIG. 10, respectively. The path information tables are the same as Table 3, Table 4, and Table 5 in FIG. 9.

In a method shown in FIG. 11, a switching node (for ease of differentiation, the switching node may be referred to as a "source switching node") sends downlink available bandwidth information of a link connected to an upper port of the switching node to another same-stage switching node that is connected to an upward-connected switching node; and after receiving the available bandwidth information, the upward-connected switching node updates, based on an uplink available bandwidth of a link of an egress port when forwarding the available bandwidth information to another downward-connected switching node, available bandwidth information that needs to be forwarded. An updating method is taking a smallest value between the uplink available bandwidth of the link of the egress port and a received available bandwidth value. When receiving available bandwidth information, the switching node $A_{*.1}$ uses a received value as an available bandwidth of a path from a receive end of the switching node $A_{*.1}$ to the source switching node. For example, as shown in FIG. 11, $A_{3.1}$ sends a downlink available bandwidth (whose value is 6) of a link L $<C_{1.2}, A_{2.1}>$ to the nodes $A_{1.1}$ and $A_{3.1}$ by using an upper port P4; when forwarding information about the available bandwidth to $A_{1.1}$, $C_{1.2}$ compares the information with an uplink available bandwidth (whose value is 3) of a link L $<C_{1.2}, A_{1.1}>$ to determine a smallest value (a value of 3), updates the available bandwidth information by using the value, and then forwards updated available bandwidth information to the switching node $A_{1.1}$; and when receiving the available bandwidth information by using a port P4, $A_{1.1}$ uses the available bandwidth value (a value of 3) as an available bandwidth of a path from the port P4 of $A_{1.1}$ to the switching node $A_{3.1}$. According to the method, each switching node $A_{*.1}$ can obtain available bandwidth information of a path from $A_{*.1}$ to another same-stage switching node. In addition, because a plurality of parallel paths may exist between two switching nodes, the switching node may further obtain an available bandwidth of an aggregate path from the switching node to another switching node through calculation, where the available bandwidth of the aggregate path is equal to a sum of available bandwidths of all the parallel paths between the two switching nodes. These switching nodes store the path information into the path information tables of these switching nodes. For example, path information tables of $A_{1.1}$, $A_{2.1}$, and $A_{3.1}$ are Table 1, Table 2, and Table 3 in FIG. 11, respectively. The path information tables are consistent with results of a method 1 and a method 2.

Figure 12:
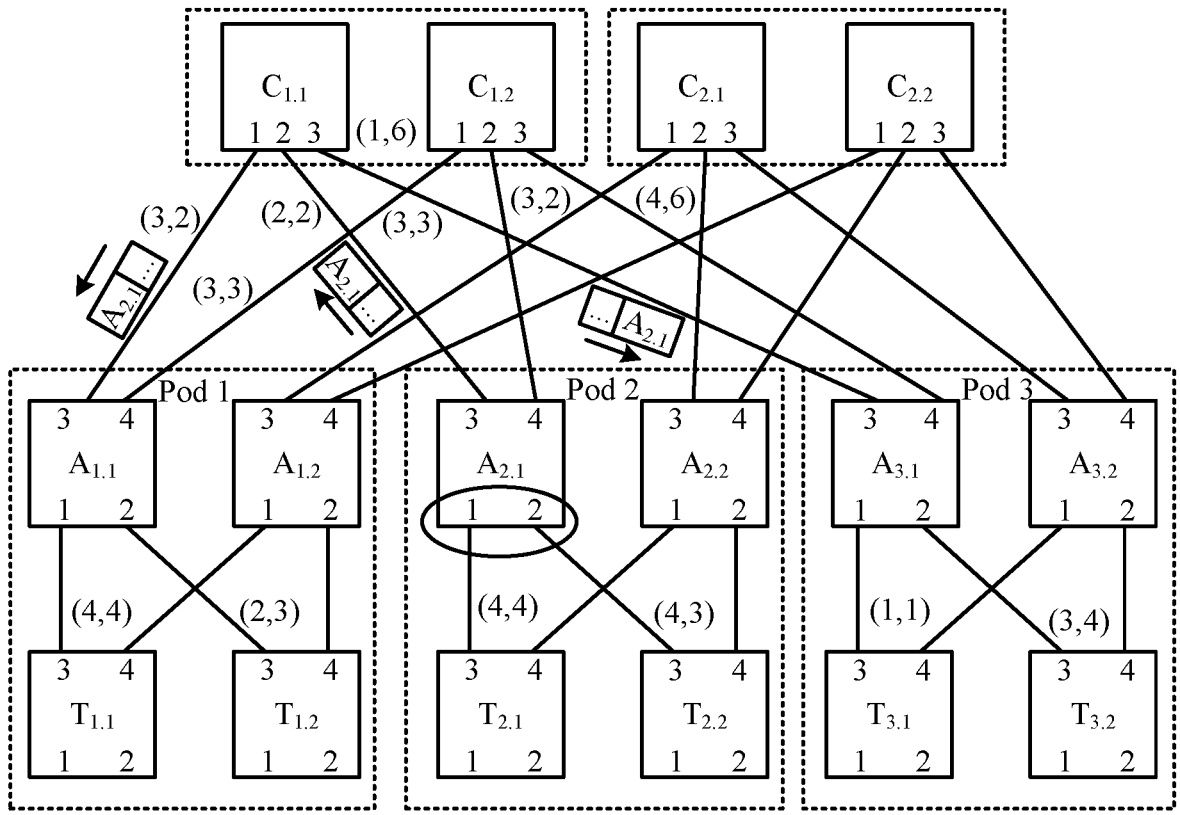
FIG. 12 is a schematic diagram of a network path measurement method according to yet another embodiment of the present disclosure.

With reference to FIG. 8 to FIG. 11, the foregoing describes measurement of an aggregate available bandwidth of a congestion measurement path of an aggregate path between same-stage switching nodes whose distance is 2. With reference to FIG. 12, the following describes measurement of an aggregate available bandwidth of a congestion measurement path of an aggregate path between same-stage switching nodes whose distance is 2k (k>1). The method may include two or three execution manners. A first execution manner may be: calculating, by a switching node, an aggregate available bandwidth of a path from an upper port of a downward-connected switching node of the switching node to another same-stage switching node of the downward-connected switching node, and sending the determined aggregate available bandwidth to the corresponding downward-connected switching node. A second execution manner and a third execution manner are: calculating, by a switching node, an aggregate available bandwidth of a path from the switching node to another switching node. Basic steps of the first execution manner are as follows:

Step a: Each intermediate switching node (for ease of description, the intermediate switching node is referred to as a "source intermediate switching node") sends, to another reachable same-stage intermediate switching node, a message carrying downlink available bandwidth information of a link from each lower port of the intermediate switching node to each downward-connected switching node of the intermediate switching node.

Step b: After receiving the message, the another intermediate switching node calculates an aggregate available bandwidth from each downward-connected switching node of the another intermediate switching node to each downward-connected switching node of the source intermediate switching node based on the available bandwidth information in the message, an aggregate available bandwidth from the another intermediate switching node to the source intermediate switching node, and uplink available bandwidth information of a link from a lower port of the another intermediate switching node to a downward-connected switching node of the another intermediate switching node, and then sends the aggregate available bandwidth obtained through calculation to the corresponding downward-connected switching node, where a calculation method is taking a smallest value among available bandwidths of series paths.

Step c: After receiving the aggregate available bandwidth, the downward-connected switching node of the another intermediate switching node uses the aggregate available bandwidth as an aggregate available bandwidth from an upper port, of the downward-connected switching node of the another intermediate switching node, that receives the information to the downward-connected switching node of the source intermediate switching node.

In the second execution manner, optionally, after receiving the message that carries the available bandwidth information and that is from the same-stage source intermediate switching node, the another intermediate switching node may calculate only an aggregate path available bandwidth from the another intermediate switching node to a downward-connected switching node of the source intermediate switching node. Then, the intermediate switching node delivers the aggregate available bandwidth obtained through calculation to a downward-connected switching node of the intermediate switching node, and the downward-connected switching node calculates an aggregate available bandwidth from an upper port of the downward-connected switching node to each downward-connected switching node of the source intermediate switching node based on the received aggregate available bandwidth information and an uplink available bandwidth of a link connected to a receive port of the downward-connected switching node. A calculation method is taking a smallest value among available bandwidths of series paths. Basic steps of the second execution manner are as follows:

Step a: Each intermediate switching node (for ease of description, the intermediate switching node is referred to as a "source intermediate switching node") sends, to another reachable same-stage intermediate switching node, a message carrying downlink available bandwidth information of a link from each lower port of the intermediate switching node to each downward-connected switching node of the intermediate switching node.

Step b: After receiving the message of the source intermediate switching node, the another intermediate switching node calculates an aggregate available bandwidth from the another intermediate switching node to each downward-connected switching node of the source intermediate switching node based on the available bandwidth information in the message and information about an aggregate available bandwidth from the another intermediate switching node to the source intermediate switching node, and then sends the aggregate available bandwidth obtained through calculation to all downward-connected switching nodes, where a calculation method is taking a smallest value among available bandwidths of series paths.

Step c: After receiving the aggregate available bandwidth, the downward-connected switching node calculates an aggregate available bandwidth from an upper port that receives the information and that is of the downward-connected switching node to another same-stage switching node based on the received aggregate available bandwidth and an uplink available bandwidth of a link connected to a receive port of the downward-connected switching node, and uses a calculation result as an aggregate available bandwidth from the upper port of the downward-connected switching node to the another same-stage switching node, where a calculation method is taking a smallest value among available bandwidths of series paths.

In the third execution manner, optionally, after receiving the message that carries the available bandwidth information and that is from the same-stage source intermediate switching node, the another intermediate switching node may send, to a downward-connected switching node of the another intermediate switching node, both the bandwidth information in the message and information about an aggregate bandwidth from the another intermediate switching node to the source intermediate switching node. The downward-connected switching node calculates an aggregate available bandwidth from an upper port of the downward-connected switching node to a downward-connected switching node of the source intermediate switching node based on the received bandwidth information and an uplink available bandwidth of a link connected to the upper port that receives the bandwidth information and that is of the downward-connected switching node. Basic steps of the third execution manner are as follows:

Step a: Each intermediate switching node (for ease of description, the intermediate switching node is referred to as a "source intermediate switching node") sends, to another reachable same-stage intermediate switching node, a message carrying downlink available bandwidth information of a link from each lower port of the intermediate switching node to each downward-connected switching node of the intermediate switching node.

Step b: After receiving the message of the source intermediate switching node, the another intermediate switching node sends both the bandwidth information (that is, downlink available bandwidth information of a link from each lower port of the source intermediate switching node to the downward-connected switching node) in the message and information about an aggregate available bandwidth from the another intermediate switching node to the source intermediate node to the downward-connected switching node of the another intermediate switching node.

Step c: After receiving bandwidth information sent by an upward-connected intermediate switching node of the downward-connected switching node, the downward-connected switching node calculates an aggregate available bandwidth from an upper port of the downward-connected switching node to each downward-connected switching node of the source intermediate switching node based on the information about the aggregate available bandwidth from the upward-connected intermediate switching node of the downward-connected switching node to the source intermediate switching node, downlink available bandwidth information of a link from each lower port of the source intermediate switching node to the downward-connected switching node, and an uplink available bandwidth of a link connected to an upper port that receives bandwidth information and that is of the downward-connected switching node, and then uses a calculation result as an aggregate available bandwidth from the upper port to the downward-connected switching node of the source intermediate switching node, where a calculation method is taking a smallest value among available bandwidths of series paths.

In addition, by using any one of the foregoing three execution manners, the downward-connected switching node can obtain the aggregate available bandwidth from each upper port of the downward-connected switching node to another same-stage switching node. The downward-connected switching node calculates a sum of aggregate available bandwidths from different upper ports to another same-stage switching node, so as to obtain an aggregate available bandwidth from the downward-connected switching node to the another same-stage switching node. Optionally, if the downward-connected switching node is already an edge switching node, the aggregate available bandwidth from the downward-connected switching node to the another same-stage switching node may not be calculated.

The following specifically describes the first execution manner by using FIG. 12 as an example. An intermediate switching node $A_{2.1}$ sends, to switching nodes $A_{1.1}$ and $A_{3.1}$, a message that carries downlink available bandwidth information (a value of 4) of a downward-connected link L <$A_{2.1}$, $T_{2.1}$> of the node $A_{2.1}$ and downlink available bandwidth information (a value of 3) of a downward-connected link L <$A_{2.1}$, $T_{2.2}$> of the node $A_{2.1}$. After receiving the message, the intermediate switching node $A_{1.1}$ calculates an aggregate available bandwidth from an upper port of each downward-connected switching node of $A_{1.1}$ to each downward-connected switching node of $A_{2.1}$. The calculation method is described by using calculation of an aggregate available bandwidth from a port P3 of a switching node $T_{1.2}$ to a switching node $T_{2.2}$ as an example: using, as the aggregate available bandwidth from the upper port P3 of the switching node $T_{1.2}$ to the switching node $T_{2.2}$, a smallest value (a value of 2) among "the downlink available bandwidth (whose value is 3), in the message, of the link L <$A_{2.1}$, $T_{2.2}$>", "an aggregate available bandwidth (whose value is 4), in a path information table of $A_{1.1}$, from $A_{1.1}$ to $A_{2.1}$", and "an uplink available bandwidth (whose value is 2) of a link L <$A_{1.1}$, $T_{1.2}$>", that is, using a smallest value among available bandwidths of all path segments as an available bandwidth of an entire path. According to the method, $A_{1.1}$ can obtain an aggregate available bandwidth from an upper port P3 of each downward-connected switching node ($T_{1.1}$ and $T_{1.2}$) of $A_{1.1}$ to each downward-connected switching node ($T_{2.1}$ and $T_{2.2}$) of $A_{2.1}$ through calculation. Then, $A_{1.1}$ sends aggregate available bandwidth information of each path obtained through calculation to a source switching node (the downward-connected switching node of $A_{1.1}$) of the path. For example, $A_{1.1}$ sends, to $T_{1.2}$, an aggregate available bandwidth (whose value is 2) of $T_{1.2}$ to $T_{2.1}$ and an aggregate available bandwidth (whose value is 2) of $T_{1.2}$ to $T_{2.2}$. Finally, as shown in Table 3, Table 4, Table 5, and Table 6 in FIG. 12, switching nodes $T_{1.1}$, $T_{1.2}$, $T_{3.1}$, and $T_{3.2}$ can obtain aggregate available bandwidths from upper ports P3 thereof to switching nodes $T_{2.1}$ and $T_{2.2}$. The switching node $T_{*.*}$ calculates a sum of aggregate available bandwidths from upper ports of the switching node $T_{*.*}$ to a switching node, so as to further obtain an aggregate available bandwidth of an aggregate path between switching nodes through calculation.

The second execution manner and the third execution manner are similar to the first execution manner, except that switching nodes that calculate aggregate available bandwidths are different. Details are not described by using examples.

In this embodiment of the present disclosure, the first switching node in the Clos switching network can calculate an aggregate available bandwidth of a path from a first target port of at least one next-stage node connected to the first switching node to another next-stage node, so that the next-stage switching node dynamically schedules traffic between ports based on an aggregate available bandwidth corresponding to each port, to implement load balancing. This improves efficiency of network path measurement.

Figure 13:
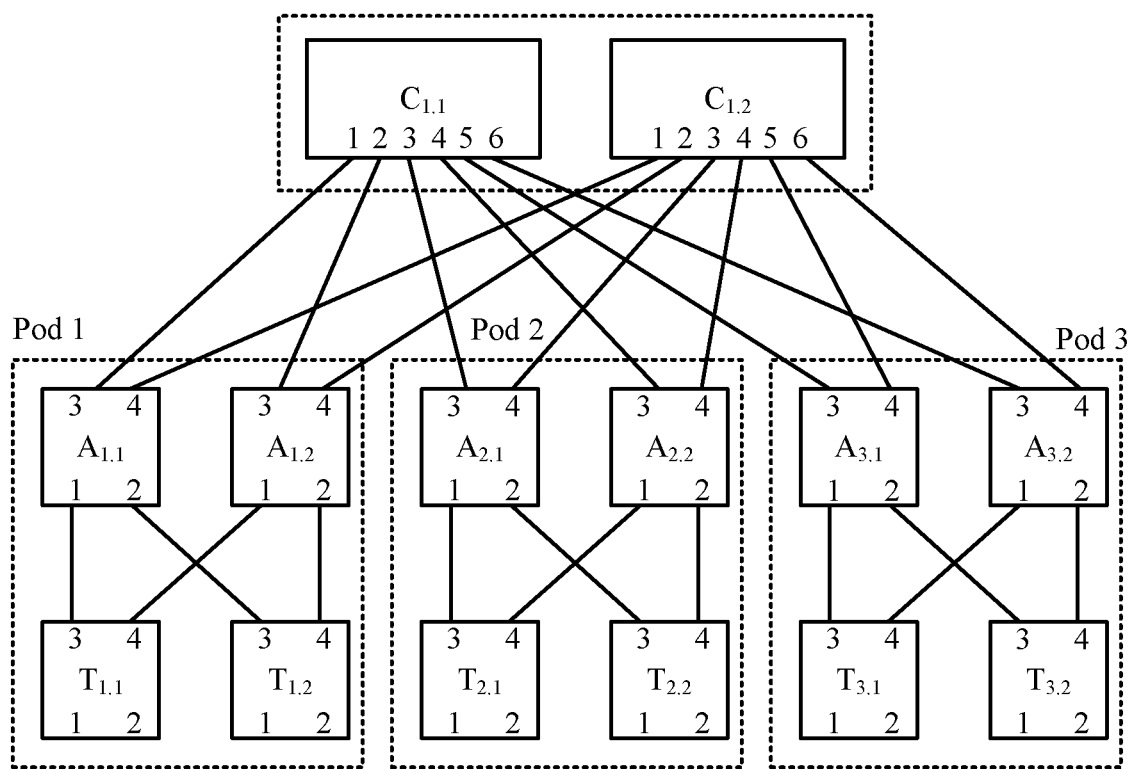
FIG. 13 is a schematic structural diagram of a multistage Clos network according to yet another embodiment of the present disclosure.
Figure 14:
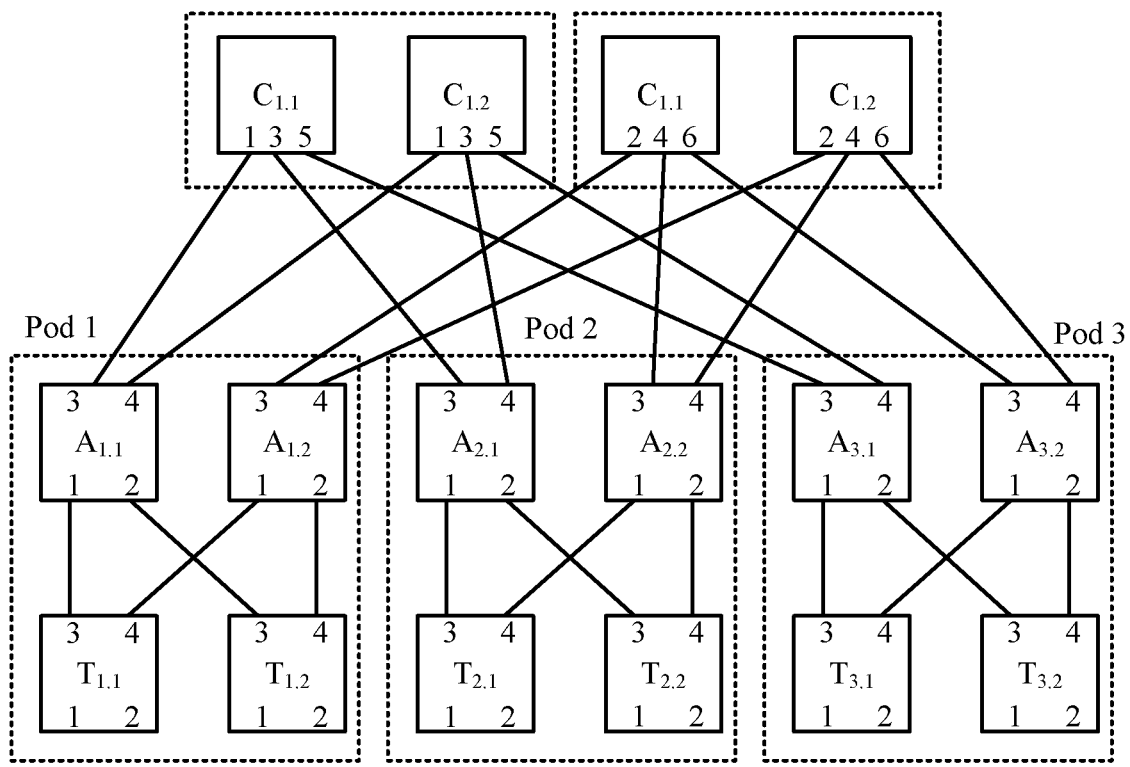
FIG. 14 is a schematic structural diagram of a multistage Clos network according to yet another embodiment of the present disclosure.

In addition, it should be noted that, in the prior art, there is a variant of a multistage Clos switching network that does not meet a definition of a standard Clos switching network, as shown in FIG. 13. For example, in FIG. 13, a root switching node is connected not only to one port of one switching node in each pod. However, as shown in FIG. 14, FIG. 14 is a standard multistage Clos switching network obtained by re-dividing the multistage Clos switching network in FIG. 13. The multistage Clos switching network can always be converted into a logically standard multistage Clos network by dividing ports of the multistage Clos switching network. Therefore, this embodiment of the present disclosure is also applicable to a variant switching network of the Clos switching network.

Figure 15:
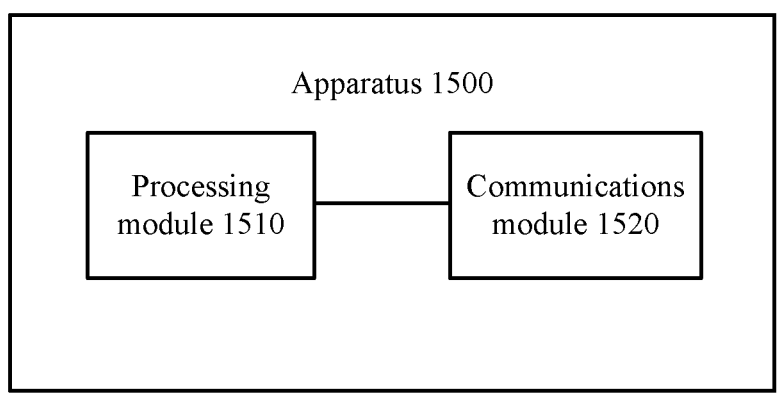
FIG. 15 is a schematic diagram of an apparatus according to an embodiment of the present disclosure.

FIG. 15 is a schematic block diagram of an apparatus 1500 according to an embodiment of the present disclosure. The apparatus 1500 may be a switch, or the apparatus 1500 may be an entity module having a switch function. The apparatus 1500 can perform steps performed by the first switching node in the method in FIG. 1 to FIG. 14. The apparatus 1500 includes a communications module 1510 and a processing module 1520.

The processing module 1520 is configured to obtain, by using the communications module 1510, a first aggregate available bandwidth of a path from the first switching node to a second switching node, where the first switching node and the second switching node are same-stage switching nodes in the Clos switching network.

The processing module 1520 is further configured to obtain, by using the communications module 1510, a first available bandwidth of a path from a first target port of a third switching node to the first switching node, where the third switching node is a next-stage switching node connected to the first switching node.

The processing module 1520 is further configured to obtain, by using the communications module 1510, a second available bandwidth of a path from the second switching node to a fourth switching node, where the fourth switching node is a next-stage switching node connected to the second switching node.

The processing module 1520 is further configured to determine a second aggregate available bandwidth of a path from the first target port of the third switching node to the fourth switching node, where the second aggregate available bandwidth is a smallest available bandwidth among the first aggregate available bandwidth, the first available bandwidth, and the second available bandwidth.

In this embodiment of the present disclosure, the first switching node in the Clos switching network can calculate, in the foregoing manner, an aggregate available bandwidth of a path from a first target port of at least one next-stage switching node connected to the first switching node to another next-stage switching node, so that the next-stage switching node dynamically schedules traffic between ports based on an aggregate available bandwidth corresponding to each port, to implement load balancing. The method simplifies network path measurement and improves efficiency of the network path measurement.

Figure 16:
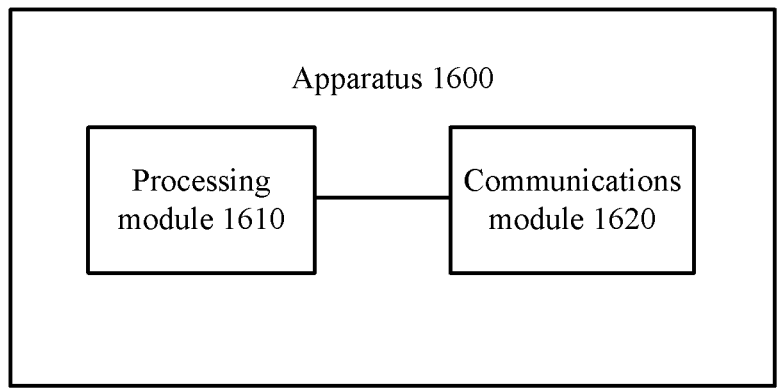
FIG. 16 is a schematic diagram of an apparatus according to another embodiment of the present disclosure.

FIG. 16 is a schematic block diagram of an apparatus 1600 according to an embodiment of the present disclosure. The apparatus 1600 may be a switch, or the apparatus 1600 may be an entity module having a switch function. The apparatus 1600 can perform steps performed by the third switching node in the method in FIG. 1 to FIG. 14. The apparatus 1600 includes a communications module 1610 and a processing module 1620.

The processing module 1610 is configured to obtain, by using the communications module 1620, a first available bandwidth of a path from a first target port of the third switching node to a first switching node, where the third switching node is a next-stage switching node connected to the first switching node.

The processing module 1610 is further configured to obtain, by using the communications module 1620, a third aggregate available bandwidth of a path from the first switching node to a fourth switching node, where the fourth switching node and the third switching node are same-stage switching nodes.

The processing module 1610 is further configured to determine a second aggregate available bandwidth of a path from the first target port of the third switching node to the fourth switching node, where the second aggregate available bandwidth is a smaller available bandwidth between the first available bandwidth and the third aggregate available bandwidth.

In this embodiment of the present disclosure, the third switching node in the Clos switching network can calculate an aggregate available bandwidth from the first target port of the third switching node to the fourth switching node in the foregoing manner, so that the third switching node dynamically schedules traffic between ports based on an aggregate available bandwidth corresponding to each port, to implement load balancing. This improves efficiency of network path measurement.

Figure 17:
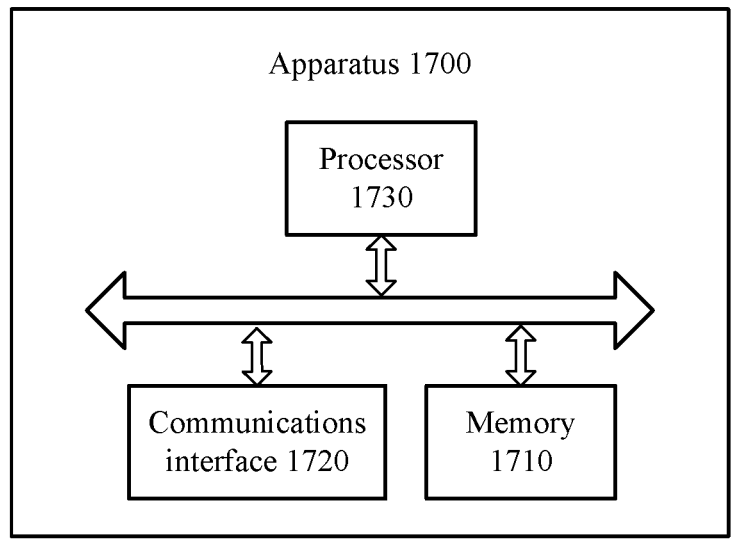
FIG. 17 is a schematic diagram of an apparatus according to another embodiment of the present disclosure.

FIG. 17 is a schematic block diagram of an apparatus 1700 according to an embodiment of the present disclosure. The apparatus 1700 may be a switch, or the apparatus 1700 may be an entity module having a switch function. The apparatus 1700 can perform steps performed by the first switching node in the method in FIG. 1 to FIG. 14. The apparatus 1700 includes:

a memory 1710, configured to store a program;

a communications interface 1720, configured to communicate with another device; and a processor 1730, configured to execute the program stored in the memory 1710, and when the program is executed, the processor 1730 is configured to: obtain, by using the communications interface 1710, a first aggregate available bandwidth of a path from the first switching node to a second switching node, where the first switching node and the second switching node are same-stage switching nodes in the Clos switching network; obtain, by using the communications interface 1710, a first available bandwidth of a path from a first target port of a third switching node to the first switching node, where the third switching node is a next-stage switching node connected to the first switching node; obtain, by using the communications interface 1710, a second available bandwidth of a path from the second switching node to a fourth switching node, where the fourth switching node is a next-stage switching node connected to the second switching node; and determine a second aggregate available bandwidth of a path from the first target port of the third switching node to the fourth switching node, where the second aggregate available bandwidth is a smallest available bandwidth among the first aggregate available bandwidth, the first available bandwidth, and the second available bandwidth.

In this embodiment of the present disclosure, the first switching node in the Clos switching network can calculate, in the foregoing manner, an aggregate available bandwidth of a path from a first target port of at least one next-stage switching node connected to the first switching node to another next-stage switching node, so that the next-stage switching node dynamically schedules traffic between ports based on an aggregate available bandwidth corresponding to each port, to implement load balancing. The method simplifies network path measurement and improves efficiency of the network path measurement.

Figure 18:
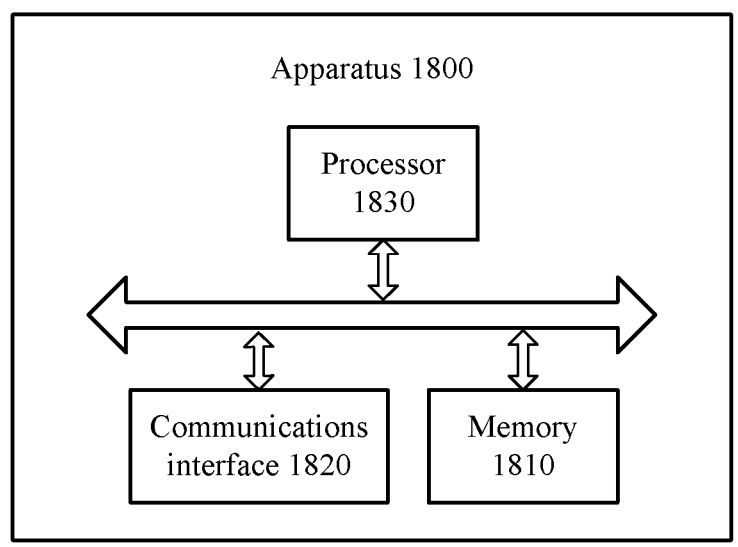
FIG. 18 is a schematic diagram of an apparatus according to another embodiment of the present disclosure.

FIG. 18 is a schematic block diagram of an apparatus 1800 according to an embodiment of the present disclosure. The apparatus 1800 may be a switch, or the apparatus 1800 may be an entity module having a switch function. The apparatus 1800 can perform steps performed by the third switching node in the method in FIG. 1 to FIG. 14. The apparatus 1800 includes:

a memory 1810, configured to store a program;

a communications interface 1820, configured to communicate with another device; and a processor 1830, configured to execute the program stored in the memory 1810, and when the program is executed, the processor 1830 is configured to: obtain, by using the communications interface 1820, a first available bandwidth of a path from a first target port of the third switching node to a first switching node, where the third switching node is a next-stage switching node connected to the first switching node; obtain, by using the communications interface 1820, a third aggregate available bandwidth of a path from the first switching node to a fourth switching node, where the fourth switching node and the third switching node are same-stage switching nodes; and determine a second aggregate available bandwidth of a path from the first target port of the third switching node to the fourth switching node, where the second aggregate available bandwidth is a smaller available bandwidth between the first available bandwidth and the third aggregate available bandwidth.

In this embodiment of the present disclosure, the third switching node in the Clos switching network can calculate an aggregate available bandwidth from the first target port of the third switching node to the fourth switching node in the foregoing manner, so that the third switching node dynamically schedules traffic between ports based on an aggregate available bandwidth corresponding to each port, to implement load balancing. This improves efficiency of network path measurement.

In addition, the terms "system" and "network" may usually be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that in the embodiments of the present disclosure, "B corresponding to A" indicates that B is associated with A, and B may be determined based on A. However, it should be further understood that determining B based on A does not mean that B is determined based only on A, that is, B may be determined based on A and/or other information.

It should be understood that sequence numbers of the foregoing processes do not mean execution sequences in various embodiments of the present disclosure. The execution sequences of the processes should be determined based on functions and internal logic of the processes, and should not be construed as any limitation to the implementation processes of the embodiments of the present disclosure.

It may be understood that the processor in the embodiments of the present disclosure may be an integrated circuit chip having a signal processing capability. In an implementation process, steps in the foregoing method embodiments may be implemented by using a hardware integrated logic circuit in the processor, or by using instructions in a form of software. The foregoing processor may be a general-purpose processor, a digital signal processor (DSP), an application-specific integrated circuit (ASIC), a field programmable gate array FPGA) or another programmable logical device, a discrete gate or a transistor logic device, or a discrete hardware component. The methods, the steps, and logical block diagrams that are disclosed in the embodiments of the present disclosure can be implemented or performed. The general-purpose processor may be a microprocessor, or the processor may be any conventional processor, or the like. Steps of the methods disclosed with reference to the embodiments of the present disclosure may be directly performed and implemented by using a hardware decoding processor, or may be performed and implemented by using a combination of hardware and software modules in a decoding processor. A software module may be located in a mature storage medium in the art, such as a random access memory, a flash memory, a read-only memory, a programmable read-only memory or an electrically erasable programmable memory, or a register. The storage medium is located in the memory, and a processor reads information from the memory and implements the steps in the foregoing methods in combination with hardware of the processor.

It may be understood that the memory in the embodiments of the present disclosure may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external cache. By using examples but not restrictive descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (Synchlink DRAM, SLDRAM), and a direct rambus dynamic random access memory (DR RAM). It should be noted that the memory of the systems and methods described in this specification includes but is not limited to these memories and any memory of another proper type.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

A person skilled in the art may clearly understand that, for the purpose of convenient and brief description, for a specific working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through by using interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of the present disclosure may be integrated into one processing unit, or each of the units may exist alone physically, or at least two units are integrated into one unit.

When the functions are implemented in a form of a software functional unit and sold or used as an independent product, the functions may be stored in a computer-readable storage medium. Based on such an understanding, the technical solutions of the present disclosure essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present disclosure. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A network path measurement method, comprising:
obtaining, by a first switching node in a Clos switching network, a first aggregate available bandwidth of a path from the first switching node to a second switching node, wherein the first switching node and the second switching node are same-stage switching nodes in the Clos switching network;
obtaining, by the first switching node, a first available bandwidth of a path from a first target port of a third switching node to the first switching node, wherein the third switching node is a next-stage switching node connected to the first switching node;
obtaining, by the first switching node, a second available bandwidth of a path from the second switching node to a fourth switching node, wherein the fourth switching node is a next-stage switching node connected to the second switching node; and
determining, by the first switching node, a second aggregate available bandwidth of a path from the first target port of the third switching node to the fourth switching node, wherein the second aggregate available bandwidth is a smallest available bandwidth from among the first aggregate available bandwidth, the first available bandwidth, and the second available bandwidth.

2. The method according to claim 1, wherein the obtaining, by a first switching node in a Clos switching network, a first aggregate available bandwidth of a path from the first switching node to a second switching node comprises:
receiving, by the first switching node, first information from each of a plurality of fifth switching nodes, wherein the first information indicates an aggregate available bandwidth of a first path corresponding to each of the plurality of fifth switching nodes, the plurality of fifth switching nodes are previous-stage switching nodes connected to the first switching node, and the first path is a path from the first switching node to the second switching node through each fifth switching node; and
determining, by the first switching node based on the first information, a sum of aggregate available bandwidths of first paths corresponding to the plurality of fifth switching nodes as the first aggregate available bandwidth.

3. The method according to claim 1, wherein the first switching node and the second switching node are next-stage switching nodes connected to a plurality of sixth switching nodes in the Clos switching network; and
the obtaining, by a first switching node in a Clos switching network, a first aggregate available bandwidth of a path from the first switching node to a second switching node comprises:
obtaining, by the first switching node, an uplink available bandwidth of a path from the first switching node to each of the plurality of sixth switching nodes;
receiving, by the first switching node, second information from each of the sixth switching nodes, wherein the second information is used to indicate a downlink available bandwidth from each of the sixth switching nodes to the second switching node;
determining, by the first switching node, a smaller available bandwidth between the uplink available bandwidth and the downlink available bandwidth as an available bandwidth corresponding to each of the sixth switching nodes; and
determining a sum of available bandwidths corresponding to the plurality of sixth switching nodes as the first aggregate available bandwidth.

4. The method according to claim 1, wherein the obtaining, by the first switching node, a second available bandwidth of a path from the second switching node to a fourth switching node comprises:
receiving, by the first switching node, third information sent by the second switching node, wherein the third information is used to indicate that an available bandwidth of the path from the second switching node to the fourth switching node is the second available bandwidth.

5. The method according to claim 1, wherein the method further comprises: sending, by the first switching node, fourth information to the third switching node, wherein the fourth information is used to indicate that an available bandwidth from the first target port of the third switching node to the fourth switching node is the second aggregate available bandwidth.

6. A network path measurement method, comprising:
obtaining, by a third switching node in a Clos switching network, a first available bandwidth of a path from a first target port of the third switching node to a first switching node, wherein the third switching node is a next-stage switching node connected to the first switching node;
obtaining, by the third switching node, a third aggregate available bandwidth of a path from the first switching node to a fourth switching node, wherein the fourth switching node and the third switching node are same-stage switching nodes; and
determining, by the third switching node, a second aggregate available bandwidth of a path from the first target port of the third switching node to the fourth switching node, wherein the second aggregate available bandwidth is a smaller available bandwidth of the first available bandwidth and the third aggregate available bandwidth.

7. The method according to claim 6, wherein the third aggregate available bandwidth is a smaller available bandwidth of a first aggregate available bandwidth and a second available bandwidth, the first aggregate available bandwidth is an aggregate available bandwidth of a path from the first switching node to a second switching node, the second available bandwidth is an available bandwidth of a path from the second switching node to the fourth switching node, and the second switching node is a previous-stage switching node connected to the fourth switching node.

8. The method according to claim 6, wherein the obtaining, by the third switching node, a third aggregate available bandwidth of a path from the first switching node to a fourth switching node comprises:
receiving, by the third switching node, first indication information from the first switching node, wherein the first indication information is used to indicate that an aggregate available bandwidth of the path from the first switching node to the fourth switching node is the third aggregate available bandwidth.

9. The method according to claim 6, wherein the obtaining, by the third switching node, a third aggregate available bandwidth of a path from the first switching node to a fourth switching node comprises:

receiving, by the third switching node, second indication information sent by the first switching node, wherein the second indication information is used to indicate the first aggregate available bandwidth of the path from the first switching node to the second switching node;

receiving, by the third switching node, third indication information sent by the second switching node, wherein the third indication information is used to indicate the second available bandwidth of the path from the second switching node to the fourth switching node; and determining, by the third switching node, the third aggregate available bandwidth, wherein the third aggregate available bandwidth is the smaller available bandwidth of the first aggregate available bandwidth and the second available bandwidth.

10. The method according to claim 6, wherein the method further comprises: determining, by the third switching node, a fourth aggregate available bandwidth from the third switching node to the fourth switching node, wherein the fourth aggregate available bandwidth is a sum of aggregate available bandwidths of paths from all ports of the third switching node to the fourth switching node.

11. A network path measurement apparatus, wherein the apparatus is a first switching node in a Clos switching network, and comprises a communications interface and a processor, wherein the processor is configured to obtain, using the communications interface, a first aggregate available bandwidth of a path from the first switching node to a second switching node, wherein the first switching node and the second switching node are same-stage switching nodes in the Clos switching network;

the processor is further configured to obtain, using the communications interface, a first available bandwidth of a path from a first target port of a third switching node to the first switching node, wherein the third switching node is a next-stage switching node connected to the first switching node;

the processor is further configured to obtain, using the communications interface, a second available bandwidth of a path from the second switching node to a fourth switching node, wherein the fourth switching node is a next-stage switching node connected to the second switching node; and the processor is further configured to determine a second aggregate available bandwidth of a path from the first target port of the third switching node to the fourth switching node, wherein the second aggregate available bandwidth is a smallest available bandwidth from among the first aggregate available bandwidth, the first available bandwidth, and the second available bandwidth.

12. The apparatus according to claim 11, wherein the processor configured to: receive, by using the communications interface, first information from each of a plurality of fifth switching nodes, wherein the first information indicates an aggregate available bandwidth of a first path corresponding to each of the plurality of fifth switching nodes, the plurality of fifth switching nodes are previous-stage switching nodes connected to the first switching node, and the first path is a path from the first switching node to the second switching node through each fifth switching node; and determine, based on the first information, a sum of aggregate available bandwidths of first paths corresponding to the plurality of fifth switching nodes as the first aggregate available bandwidth.

13. The apparatus according to claim 11, wherein the first switching node and the second switching node are next-stage switching nodes connected to a plurality of sixth switching nodes in the Clos switching network; and the processor is configured to: obtain, using the communications interface, an uplink available bandwidth of a path from the first switching node to each of the plurality of sixth switching nodes; receive, using the communications interface, second information from each of the sixth switching nodes, wherein the second information is used to indicate a downlink available bandwidth from each of the sixth switching nodes to the second switching node; determine a smaller available bandwidth of the uplink available bandwidth and the downlink available bandwidth as an available bandwidth corresponding to each of the sixth switching nodes; and determine a sum of available bandwiths corresponding to the plurality of sixth switching nodes as the first aggregate available bandwidth.

14. The apparatus according to claim 11, wherein the processor is configured to receive, using the communications interface, third information sent by the second switching node, wherein the third information is used to indicate that an available bandwidth of the path from the second switching node to the fourth switching node is the second available bandwidth.

15. The apparatus according to claim 11, wherein the processor is further configured to send fourth information to the third switching node by using the communications interface, wherein the fourth information is used to indicate that an available bandwidth from the first target port of the third switching node to the fourth switching node is the second aggregate available bandwidth.

16. A network path measurement apparatus, wherein the apparatus is a third switching node in a Clos switching network, and comprises a processor and a communications interface, wherein the processor is configured to obtain, using the communications interface, a first available bandwidth of a path from a first target port of the third switching node to a first switching node, wherein the third switching node is a next-stage switching node connected to the first switching node;

the processor is further configured to obtain, using the communications interface, a third aggregate available bandwidth of a path from the first switching node to a fourth switching node, wherein the fourth switching node and the third switching node are same-stage switching nodes; and the processor is further configured to determine a second aggregate available bandwidth of a path from the first target port of the third switching node to the fourth switching node, wherein the second aggregate available bandwidth is a smaller available bandwidth of the first available bandwidth and the third aggregate available bandwidth.

17. The apparatus according to claim 16, wherein the third aggregate available bandwidth is a smaller available bandwidth of a first aggregate available bandwidth and a second available bandwidth, the first aggregate available bandwidth is an aggregate available bandwidth of a path from the first switching node to a second switching node, the second available bandwidth is an available bandwidth of a path from the second switching node to the fourth switching node, and the second switching node is a previous-stage switching node connected to the fourth switching node.

18. The apparatus according to claim 16, wherein the processor is configured to receive, using the communications interface, first indication information from the first switching node, wherein the first indication information is used to indicate that an aggregate available bandwidth of the path from the first switching node to the fourth switching node is the third aggregate available bandwidth.

19. The apparatus according to claim 16, wherein the processor is configured to: receive, using the communications interface, second indication information sent by the first switching node, wherein the second indication information is used to indicate the first aggregate available bandwidth of the path from the first switching node to the second switching node; receive, using the communications interface, third indication information sent by the second switching node, wherein the third indication information is used to indicate the second available bandwidth of the path from the second switching node to the fourth switching node; and determine the third aggregate available bandwidth, wherein the third aggregate available bandwidth is the smaller available bandwidth of the first aggregate available bandwidth and the second available bandwidth.

20. The apparatus according to claim 16, wherein the processor is further configured to determine a fourth aggregate available bandwidth from the third switching node to the fourth switching node, wherein the fourth aggregate available bandwidth is a sum of aggregate available bandwidths of paths from all ports of the third switching node to the fourth switching node.

* * * * *